United States Patent
Fevola et al.

(10) Patent No.: US 12,415,904 B2
(45) Date of Patent: Sep. 16, 2025

(54) BIOBASED GLYCERYL HEPTANOATE ESTER COMPOSITIONS AND METHODS OF MAKING AND USING THE SAME

(71) Applicant: INOLEX INVESTMENT CORPORATION, Wilmington, DE (US)

(72) Inventors: Michael J. Fevola, Belle Meade, NJ (US); Gary B. Mosser, Tabernacle, NJ (US); Zongyu Zhang, Mount Laurel, NJ (US)

(73) Assignee: INOLEX INVESTMENT CORPORATION, Wilmington, DE (US)

( * ) Notice: Subject to any disclaimer, the term of this patent is extended or adjusted under 35 U.S.C. 154(b) by 834 days.

(21) Appl. No.: 17/518,822

(22) Filed: Nov. 4, 2021

(65) Prior Publication Data
US 2022/0135769 A1    May 5, 2022

Related U.S. Application Data

(60) Provisional application No. 63/109,657, filed on Nov. 4, 2020.

(51) Int. Cl.
| | | |
|---|---|---|
| C08K 5/11 | (2006.01) | |
| A01N 1/12 | (2025.01) | |
| C08K 5/053 | (2006.01) | |

(52) U.S. Cl.
CPC ............ *C08K 5/11* (2013.01); *A01N 1/12* (2025.01); *C08K 5/053* (2013.01)

(58) Field of Classification Search
CPC . C08K 5/11; C08K 5/053; A01N 1/12; A01N 37/02; A01N 31/02; A01P 1/00;
(Continued)

(56) References Cited

U.S. PATENT DOCUMENTS 3,764,376 A * 10/1973 Name .................. C11C 3/025
428/522
5,906,831 A   5/1999 Larsson et al.
(Continued)

FOREIGN PATENT DOCUMENTS

DE   10 2008 013 023 A1   7/2008
EP          694525 A1 *   1/1996   ............. B01J 31/08
(Continued)

OTHER PUBLICATIONS

Feuge et al., "Modification of Vegetable Oils: VI. The Practical Preparation of Mono- and Diglycerides," Oil & Soap: August, 259-264 (1946).
(Continued)

*Primary Examiner* — Deborah D Carr
(74) *Attorney, Agent, or Firm* — COZEN O'CONNOR

(57) ABSTRACT

The present invention relates to biobased glyceryl heptanoate compositions, and preferably glyceryl monoheptanoate compositions, methods of manufacturing the same, as well as applications thereof including the use of the inventive compositions in formulations for cosmetics and other personal care applications. The biobased monoglyceryl monoester (MGME) compositions include a mixture including one or more compounds of Formula (I):

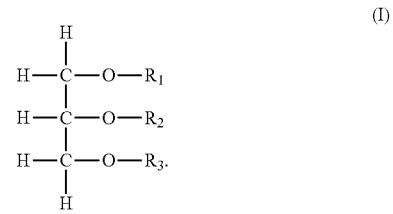

$R_1$, $R_2$, and $R_3$ are independently —H or —C(O)—$C_6$ alkyl. The composition comprises greater than about 60 wt % and less than about 98 wt % glyceryl monoheptanoate. The carbon present in the one or more compounds of Formula (I) is biobased. The composition has an $ET_{50}$ value of >24 hr when tested as a 1% solution in water according to the EpiDerm Skin Irritation Test (OECD 439). The present
(Continued)

invention also relates to microbiostatic concentrates (MBCs) including the disclosed composition.

24 Claims, 1 Drawing Sheet

(58) Field of Classification Search
CPC .... A61K 8/345; A61K 8/375; A61K 2800/51; A61K 2800/524; A61K 2800/591; A61Q 17/005
See application file for complete search history.

(56) References Cited

U.S. PATENT DOCUMENTS

| | | |
|---|---|---|
| 2015/0203778 A1* | 7/2015 | Lovine ............... C10M 129/76 508/519 |
| 2018/0207085 A1 | 7/2018 | Gregoris |
| 2021/0290514 A1 | 9/2021 | Fricke et al. |

FOREIGN PATENT DOCUMENTS

| | | | |
|---|---|---|---|
| JP | 2013231002 A | * | 11/2013 |
| WO | 2020/097175 A1 | | 5/2020 |

OTHER PUBLICATIONS

Johnson, "Final Report of the Amended Safety Assessment of Glyceryl Laurate, Glyceryl Laurate SE . . . ," International Journal of Toxicology 23: 55-94 (2004).

Kabara, "Chemisty and Biology of Monoglycerides in Cosmetic Formulations," Ch. 12 in Glycerine: A Key Cosmetic Indgredient, Jungerman et al., eds.: 311-344 (1991).

Kabara, "Fatty Acids and Esters as Multifunctionl Components," Ch. 5 in Preservative-Free and Self-Preserving Practice, Kabara et al., eds.: 119-137 (1997).

* cited by examiner

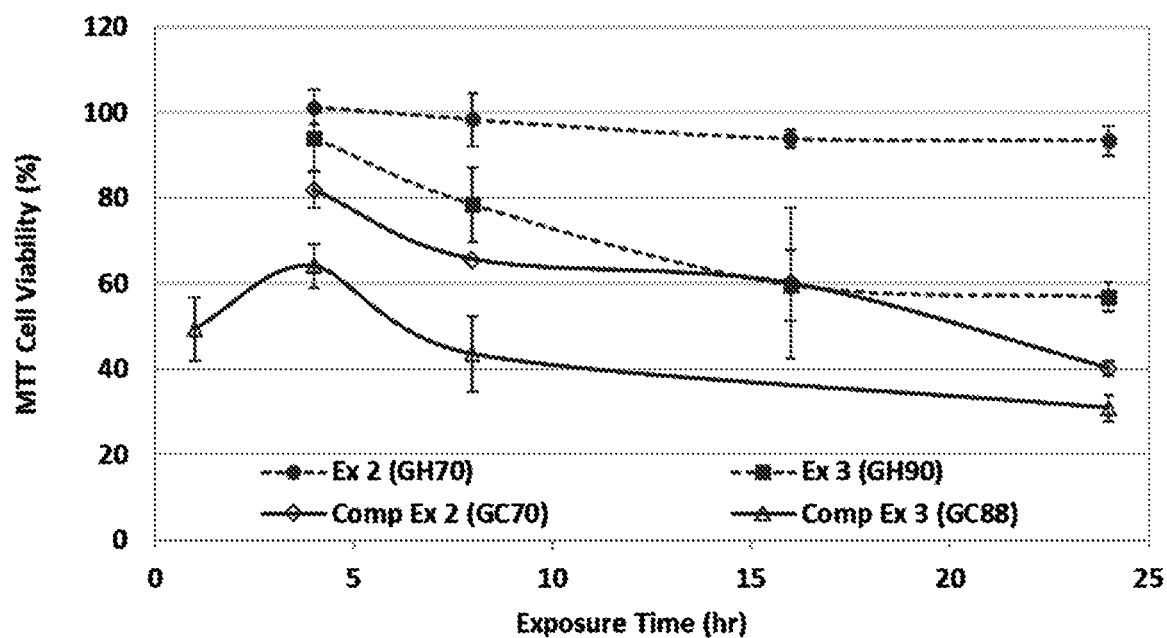

BIOBASED GLYCERYL HEPTANOATE ESTER COMPOSITIONS AND METHODS OF MAKING AND USING THE SAME

CROSS REFERENCE TO RELATED APPLICATIONS

This application claims priority to U.S. Provisional Application No. 63/109,657, filed Nov. 4, 2020, which is incorporated herein by reference.

FIELD

The present invention relates to biobased glyceryl heptanoate compositions and their method of manufacture, as well as applications thereof including use of the compositions in formulations for cosmetics and other personal care applications.

BACKGROUND OF THE TECHNOLOGY

Monoglyceryl monoesters (MGMEs), also known as monoglycerides, are compounds with wide utility across a range of applications in the cosmetic, pharmaceutical, and food industries due to their properties as nontoxic, nonionic amphiphilic compounds. (See, e.g., Kabara, J. J. Chemistry and Biology of Monoglycerides in Cosmetic Formulations, Ch. 12 in *Glycerine: A Key Cosmetic Ingredient*, Jungermann, E. and Sonntag, N. O. V., eds.; Marcel Dekker, Inc.: New York, 1991, pp 311-344; see also Johnson, Jr. W. Int. J. Tox., 2004, 23(Suppl. 2), 55-94.) In cosmetics and personal care formulations, MGMEs have been reported to function as surfactants, emulsifiers, emollients, skin conditioning agents, and deodorant agents.

Of particular interest and utility are MGMEs bearing acyl chains having eight to fourteen carbon atoms. Such MGMEs are typically viscous fluids at room temperature or soft solids with low melting temperatures. Due to their amphiphilic character, these MGMEs may be dispersed in aqueous media, where they exhibit surface activity and self-assembly at interfaces. These amphiphiles are also well suited for interaction with the amphiphiles that comprise lipid bilayers, such as those that form the cell membranes of microorganisms. As a result, $C_8$-$C_{14}$ MGMEs have found use as effective microbiostatic agents due to their ability to increase cell membrane permeability, thereby disrupting cell homeostasis and inhibiting microbial growth. (See, e.g., Kabara, J. Fatty Acids and Esters as Multifunctional Components, Ch. 5 in *Preservative-Free and Self-Preserving Cosmetics and Drugs: Principles and Practice*, Kabara and Orth, eds., Marcel Dekker, Inc.: New York, 1997, 119-138.) The most common MGMEs used for this purpose are MGMEs bearing even-numbered, linear $C_8$ to $C_{14}$ acyl chains (i.e. capryloyl, caproyl, lauroyl, or myristoyl), the MGME bearing an ω-unsaturated $C_{11}$ chain (i.e. 10-undecenoyl), or mixtures thereof.

The same properties that render $C_8$ to $C_{14}$ MGMEs effective surfactants, emulsifiers, and microbiostatic agents also make them effective skin permeation enhancers, as they can interact with and partially fluidize skin barrier lipid bilayers in the stratum corneum to make them more permeable to topically applied compounds. Thus, $C_8$-$C_{14}$ MGMEs have been widely utilized as skin penetration enhancers for transdermal delivery of pharmaceutically active ingredients. However, the ability of $C_8$ to $C_{14}$ MGMEs to modulate the permeability of the skin barrier may also lead to skin irritation, either due to the penetration of the MGME itself or the unintended penetration enhancement of other topically applied ingredients, such as fragrances, sunscreen agents, preservatives, etc. Thus, there is a need to develop MGME compositions that retain the functional utility of the $C_8$ to $C_{14}$ MGMEs and simultaneously reduce unwanted side effects, such as irritation.

Another desirable aspect of $C_8$ to $C_{14}$ MGMEs is related to their sustainability, making them especially useful for the formulation of products with reduced environmental impact. In addition to being nontoxic and Generally Regarded As Safe (GRAS) compounds, these ingredients are considered highly sustainable because they readily biodegrade and can be synthesized from renewable, plant-based feedstocks, i.e. $C_8$ to $C_{14}$ fatty acids and glycerin. These fatty acids and glycerin can be derived from any plant-derived triglyceride oils, with coconut oil and palm kernel oil being the most common sources due to their high content of these acyl chain lengths. However, recent controversy around the negative environmental and societal impacts of oil palm farming and palm/palm kernel oil production have made such sources of fatty acids and glycerin less desirable from a commercial perspective, and market demand for ingredients based on alternative sources of these plant-derived feedstocks continues to increase.

Typical (trans)esterification processes involving the reaction of glycerol with fatty acids or fatty esters to produce MGMEs yield an equilibrium distribution of glycerol ("free glycerin") and mono-, di-, and triacyl esters of glycerol. (See, e.g., Kabara.) For example, when one mole of glycerol is reacted with one mole equivalent of a fatty acid targeting an average degree of glycerol esterification of 1.0 for the monoester, the resulting equilibrium mixture will contain approximately 40-50 mol % monoester, 20-30 mol % diester, 0-10 mol % triester, and 20-30% free glycerol (See Feuge, R. O. and Bailey, A. E. Modification of Vegetable Oils, VI. The Practical Preparation of Mono- and Diglycerides, *Oil & Soap*, 1946, 23(8), 259-264). MGME products comprising ≥80% monoester are typically obtained by fractionating the initial equilibrium reaction product mixture to remove the free glycerin, diesters, and triesters to provide a more concentrated monoester product. Such fractionations are typically achieved via the energy intensive process of molecular or short-path distillation to separate the components. Other separation methods, such as extraction ("washing") may also be employed prior to distillation to remove the free glycerin, followed by fractional distillation to isolate the monoester fraction from the heavier di- and triester components.

What is needed is a MGME composition prepared from sustainable feedstock and improved methods of making and purifying the same.

BRIEF SUMMARY OF THE INVENTION

The present invention is directed to biobased monoglyceryl monoester (MGME) compositions comprising a mixture including one or more compounds of Formula (I):

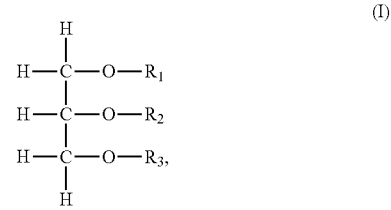

wherein $R_1$, $R_2$, and $R_3$ are independently —H or —C(O)—$C_6$ alkyl (e.g., n-heptanoyl), wherein the compositions comprise greater than about 60 wt % and less than about 98 wt % glyceryl monoheptanoate, and wherein the carbon present in the one or more compounds of Formula (I) is biobased.

The composition as in the preceding paragraph, wherein the composition comprises glyceryl diheptanoate, glyceryl triheptanoate, or a combination thereof in a concentration of about 2 wt % to about 40 wt %.

The composition as in any of the preceding paragraphs alone or in combination, wherein the composition comprises less than about 30% glycerol.

The composition as in any of the preceding paragraphs alone or in combination, wherein the composition has an average glyceryl degree of esterification of about 0.7 to about 1.4.

The composition as in any of the preceding paragraphs alone or in combination, wherein at least 95% of —C(O)—$C_6$ alkyl groups present in the composition are n-heptanoyl.

The composition as in any of the preceding paragraphs alone or in combination, wherein the composition has an $ET_{50}$ value of >24 hr when tested as a 1% solution in water according to the EpiDerm Skin Irritation Test (OECD 439).

The composition as in any of the preceding paragraphs alone or in combination, wherein the composition has an MTT cell viability value of >50% at approximately 24 hours, when tested as a 1% solution in water according to the EpiDerm Skin Irritation Test (OECD 439).

The composition as in any of the preceding paragraphs alone or in combination, further comprising a booster selected from the group consisting of: one or more polyols, one or more glyceryl ethers, one or more chelating agents, and combinations thereof.

A formulation comprising the composition as in any of the preceding paragraphs alone or in combination, wherein the formulation is preserved against microbial contamination for a period of at least 12 months, or for a period of at least 18 months, or for a period of at least 24 months.

A formulation comprising the composition as in any of the preceding paragraphs alone or in combination, wherein the formulation has equal or superior preservation against microbial contamination compared to a reference formulation containing a $C_8$ to $C_{14}$ MGME composition in the same concentration by weight as the $C_7$ biobased monoglyceryl monoester as described herein is present in the formulation.

A formulation comprising the composition as in any of the preceding paragraphs alone or in combination, wherein the formulation has a turbidity value less than about 100 NTU.

The formulation as in any of the preceding paragraphs alone or in combination, the formulation further comprising at least one ingredient selected from the group consisting of: water, surfactants, including anionic, cationic, nonionic and zwitterionic surfactants, emulsifiers, emollients, humectants, conditioning agents for hair, skin or nails, chelating agents, active agents, beaching or whitening agents, additional pH adjusting agents, fragrances, colorants, exfoliating agents, antioxidants, botanical ingredients, plant extracts, mica, smectite, thickeners, rheology modifiers, cannabinoids, oils, dyes, waxes, amino acids, nucleic acids, vitamins, hydrolyzed proteins and derivatives thereof, glycerin and derivates thereof, enzymes, anti-inflammatory and other medicaments, microbiocides, antifungals, antiseptics, antioxidants, UV absorbers, dyes and pigments, preservatives, sunscreen active agents, antiperspirant active agents, oxidizers, pH balancing agents, moisturizers, peptides and derivatives thereof, anti-aging actives, hair growth promoters, anti-cellulite actives, and combinations thereof.

A method of preserving a formulation against microbial contamination comprising adding a sufficient amount of the composition as in any of the preceding paragraphs alone or in combination.

A microbiostatic concentrate (MBC) comprising the biobased monoglyceryl monoester composition, as in any of the preceding paragraphs alone or in combination, and at least one of glycerin and a $C_3$-$C_4$ diol.

The microbiostatic concentrate as in any of the preceding paragraphs alone or in combination, wherein the microbiostatic concentrate includes the biobased monoglyceryl monoester composition in an amount from about 30 wt % to about 85 wt %.

The microbiostatic concentrate as in any of the preceding paragraphs alone or in combination, wherein the microbiostatic concentrate includes glycerin, $C_3$-$C_4$ diol, or a combination thereof in an amount from about 1 wt % to about 70 wt %.

The composition, formulation, or microbiostatic concentrate as in any of the preceding paragraphs alone or in combination, further comprising one or more polyols selected from the group consisting of: glycerin, propanediol, 1,2-propanediol, 1,2-butanediol, 1,3-butanediol, 1,4-butanediol, 2,3-butanediol, 1,2-hexanediol, 1,2-heptanediol, 2,3-octanediol, caprylyl glycol, decylene glycol, sorbitol, sorbitan, and combinations thereof.

The composition, formulation, or microbiostatic concentrate as in any of the preceding paragraphs alone or in combination, further comprising one or more glyceryl ethers selected from the group consisting of: hexylglycerin, cyclohexylglycerin, heptylglycerin, caprylyl glyceryl ether, methylheptylglycerin, ethylhexylglycerin, and combinations thereof.

The composition, formulation, or microbiostatic concentrate as in any of the preceding paragraphs alone or in combination, further comprising one or more chelating agents selected from the group consisting of: heptanohydroxamic acid and salts thereof, caprylohydroxamic acid (caprylhydroxamic acid) and salts thereof, pelargohydroxamic acid and salts thereof, citric acid and salts thereof, caprohydroxamic acid and salts thereof, tetrasodium glutamate diacetate, phytic acid and salts thereof, gluconic acid and salts thereof, galacturonic acid and salts thereof, and galactaric acid and salts thereof, and combinations thereof.

The present invention provides for sustainable, plant-based MGME compositions that overcome the irritation issues associated with $C_8$ to $C_{14}$ MGMEs without sacrificing performance, most notably microbiostatic efficacy for the preservation of formulated products.

Surprisingly, the selection of an odd-chain $C_7$ acyl group dramatically reduces the cytotoxicity and irritation potential of MGMEs while maintaining microbiostatic efficacy. Additionally, retaining some or all of the di- and triester components in the MGME composition has been discovered to further reduce the cytotoxicity and irritation potential of the $C_7$ MGME composition without diminishing microbiostatic efficacy. The $C_7$ MGME compositions of the present invention have also been found to improve the clarity and translucency of clear formulations compared to formulations prepared with traditional $C_8$ to $C_{14}$ MGMEs.

To ensure the sustainability benefits of the $C_7$ MGME compositions, the $C_7$ acid, n-heptanoic acid, must be derived from a plant-based feedstock, i.e. it must be biobased n-heptanoic acid or "bio-heptanoic acid". Bio-heptanoic acid is derived from the thermal cracking of ricinoleic acid, an unsaturated $C_{18}$ hydroxy fatty acid derived from saponification of castor oil obtained from the beans of *Ricinus*

*communis*. Thermal cracking of ricinoleic acid or its corresponding methyl ester, methyl ricinoleate, yields heptaldehyde and either undecylenic acid or methyl undecylenate. The bio-heptaldehyde is readily converted to bio-heptanoic acid via catalytic oxidation, the resulting bio-heptanoic acid having a purity of ≥99% linear, saturated $C_7$ acid (and is commercially available, e.g., from Arkema under the tradename Oleris® n-Heptanoic Acid).

The use of bio-heptanoic acid is especially important because bio-heptanoic acid does not contain branched $C_7$ acid or unsaturated impurities. For example, n-Heptanoic acid obtained from petrochemical feedstocks via the oxo process may contain up to 3.5 wt % of 2-methylhexanoic acid (Oxea n-Heptanoic Acid sales specification). Branched and/or unsaturated alkanoic acid impurities are undesirable as residual unreacted branched and/or unsaturated fatty acids can impart undesirable odors to the resulting $C_7$ MGME compositions when prepared using petrochemical based heptanoic acid.

BRIEF DESCRIPTION OF THE FIGURES AND DRAWINGS

FIG. 1 provides a graphic representation of EpiDerm™ cell viability data as a function of exposure time to 1% solutions of the MGME compositions of Examples 2 and 3 and Comparative Examples 2 and 3.

DETAILED DESCRIPTION

Before the present compounds, compositions, and methods, among others, are described, it is to be understood that the inventions described and claimed herein are not limited to the particular processes, compositions, or methodologies described, as these may vary. It is also to be understood that the terminology used in the description is for the purpose of describing the particular versions or embodiments only and is not intended to limit the scope of the present inventions, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. All patents, patent applications, and other publications cited or otherwise mentioned herein are incorporated by reference in their entirety. Nothing herein is to be construed as an admission that the inventions as recited in the appended claims are not entitled to antedate such disclosure(s) by virtue of prior invention.

As used herein and in the appended claims, the use of "a," "an," and/or "the" is intended to include both the singular and plural (e.g., "one or more") unless the context clearly dictates otherwise. Thus, for example, reference to a "cell" is a reference to one or more cells and equivalents thereof known to those skilled in the art, and so forth.

Unless specified, "%" may refer to a percent by weight percent, or a percent by volume, or a percent weight by unit volume, and the relevant units would be immediately apparent to one of ordinary skill in the art based on the context.

"Cosmetically acceptable" means suitable for use in contact with skin, preferably human skin, without undue toxicity, incompatibility, instability, irritation, allergic response, and the like.

Where applicable, chemicals are specified by their INCI Name according to the guidelines of the International Nomenclature of Cosmetic Ingredients. Additional information, including suppliers and trade names, can be found under the appropriate INCI monograph in the *International Cosmetic Ingredient Dictionary and Handbook, 16th Edition* published by the Personal Care Products Council, Washington, DC, or online in the Personal Care Products Council On-Line INFOBASE (http://online.personalcarecouncil.org).

Among the many embodiments, the present invention includes biobased $C_7$ MGME compositions. Biobased or "natural" feedstocks must be used in the production of biobased MGME compositions. An example of a biobased MGME composition is one that is prepared from a bio-derived feedstock (e.g., from current and sustainable agricultural activities, such as fermentation-, algae-, plant- or vegetable-derived; e.g., is derived from a vegetable source, preferably using a non-genetically modified organism, or biomass, and it is not petrochemically-derived (such as being derived from sustainable tree and plant farms active in the 21st century vs. fossil sources such as petroleum, natural gas, or coal). Such feedstocks are referred to herein as "natural" and "renewable" (i.e., "sustainable") and are known in the art as a non-petroleum-derived feedstock. Further, such materials are formed by "new" carbon and not from petroleum or other fossil fuel sources ("old" carbon). Such products are referred to herein as "natural" products and are known in the art as non-petrochemically-derived or "bio" products. As used herein, the term "sustainable" refers to starting materials, reaction products, compositions, and/or formulations that are derived from renewable sources. The term "sustainable" therefore is in contrast to "non-sustainable" starting materials, reaction products, compositions, and/or formulations that contain carbon from a limited natural resource, such as fossil fuel (e.g., petroleum or coal), natural gas, and the like. Thus, a natural or bio product is not petrochemically derived and/or is made from resources that are not petrochemically derived, but rather are sustainable and renewable. True natural products (bio-compounds) are formed using biomass (e.g., material stored from carbon cycle processes in living plants, roots, and the like, or released through animal respiration or refuse, or through decomposition). When carbon decomposes and is broken down over millions of years under pressure, it creates fossil fuels (the source of petrochemically-derived carbon). Bio-compounds herein are intended to include materials derived from the carbon of plant sources/biomass that exist(ed) recently and/or are sustainable, and explicitly excludes materials derived from fossil fuels.

A composition of the present invention can be identified, and distinguished from prior art compositions, by its biobased carbon content. In some embodiments, the biobased carbon content can be measured by radiocarbon dating to determine the relative age of materials comprised of organic (i.e., carbon-containing) matter. Radiocarbon is an unstable isotope of carbon, known as carbon-14 (i.e., "$^{14}C$"). $^{14}C$ is an unstable isotope that emits radiation energy in the form of beta particles at a very consistent rate (i.e. a half-life for radiocarbon is 5730 years) and ultimately decays to the more stable nitrogen-14 ($^{14}N$). Because, petroleum-based (i.e. petrochemically-derived) feedstocks are derived from plants and animals buried millions of years ago, such feedstocks' radiocarbon (i.e., $^{14}C$) has been lost to radioactive decay. The ASTM International standards provide testing standards to determine the authenticity of a "bio-based compound" using radiocarbon, which may be found in ASTM D6866-16. This standard distinguishes newer carbon from carbon derived from fossil-fuel, or petroleum- and petrochemically-derived sources, i.e., "old carbon". The amount of $^{14}$C in recent or current biomass is known, so a percentage of carbon from a renewable source can be estimated from a total organic carbon analysis, which provides the data necessary to determine if a compound is truly derived from a "natural" and/or "sustainable" ("renewable") feedstock source or is derived conversely from a compound of "old" sequestration (i.e., a petrochemically-derived or petroleum-based source). The use of petroleum-based (also termed "fossil-based") feedstocks is generally accepted as being non-sustainable, i.e., old carbon is a non-sustainable and not a renewable feedstock and furthermore is not considered "natural" and/or "sustainable" in the art.

In some embodiments, the compositions of the present invention comprise biobased carbon as substantially all of the carbon present in the mixtures of compounds, which can refer to a biobased carbon content of at least 90%, at least 95%, or at least 98%. In some embodiments, the inventive compositions include entirely biobased MGMEs and entirely biobased reactants determined to have a biobased carbon content of at least about 98%, at least about 99%, at least about 99.5%, or about 100%.

In some embodiments, the compositions of the present invention comprise a $^{14}$C content that is substantially equivalent to the present-day atmospheric $^{14}$C content, as determined according to ASTM D6866. In some embodiments, the compositions of the present invention comprise a $^{14}$C content that is at least about 90%, at least about 95%, at least about 98%, or at least about 99% of the present-day atmospheric $^{14}$C content, as determined according to ASTM D6866. In some embodiments, the compositions of the present invention comprise at least about 0.8 $^{14}$C atoms per $10^{12}$ carbon atoms present in the composition, at least about 1.0 $^{14}$C atoms per $10^{12}$ carbon atoms present in the composition, or at least about 1.2 $^{14}$C atoms per $10^{12}$ carbon atoms present in the composition, as determined according to ASTM D6866.

A more recent method for authenticating biobased feedstocks employs a detailed analysis of stable isotopes using mass spectroscopy and evaluating carbon-12/carbon-13 and/or hydrogen-1/hydrogen-2 ratios. Such testing is available through several analytical service testing organizations and is faster, more cost effective, and yields more detailed information compared to radiocarbon testing methods. Stable isotope analysis is based on the principle of kinetic isotope effect. The latter effect is well-known to those in the art of chemical kinetics arts. In the broadest terms, heavy isotopes of a particular element react slower than their lighter equivalent (e.g., carbon-12 as opposed to carbon-13). So, as plants incorporate carbon dioxide into their biomass, the ratio of carbon-12 to carbon-13 will vary depending on the type of chemistry used by the plant to make biomass (e.g., whether the plant undergoes a $C_3$ or $C_4$ photosynthesis pathway). This is commonly reported as the $\delta^{13}C/^{12}C$ ratio (i.e., $\delta^{13}C$), and is referenced to a current carbon dioxide standard. In addition, similar isotope kinetic effects are observed when water is incorporated into new biomass, and this is measured as the $\delta^2H/^1H$ ratio (i.e., $\delta^2H$). Using a combination of $\delta^{13}C$ and $\delta^2H$ ratios, one familiar with the relevant art is able to readily distinguish and validate the nature of the feedstock that was used to prepare the product being analyzed (i.e. whether it is petrochemically-derived or derived from recently living or living algae-, plant-, or similar bio-sources).

Biobased monoglyceryl monoester compositions. The biobased monoglyceryl monoester (MGME) compositions comprising compounds of Formula (I):

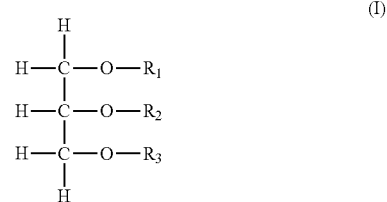

wherein $R_1$, $R_2$, and $R_3$ are independently —H or —C(O)—$C_6$ alkyl (e.g., n-heptanoyl) can be prepared, for example, by reaction of a biobased glycerin with a biobased n-heptanoic acid (bio-heptanoic acid).

In some embodiments, the $C_7$ MGME compositions of the present invention may be synthesized according to any of the methods known to those skilled in the art of glyceryl ester synthesis (see e.g., DE 102008013023 A1, which describes the synthesis of glyceryl esters of octanoic acid). A preferred route to the $C_7$ MGME compositions of the present invention is the direct esterification of biobased glycerin with bio-heptanoic acid, with removal of water as the condensation byproduct to drive the esterification reaction to completion. The bio-heptanoic acid is the limiting reagent in the synthesis, as maintaining a molar ratio of bio-heptanoic acid to glycerin less than or equal to one (≤1) favors formation of the monoester product and limits formation of the di- and triester coproducts in the resulting mixture. The ratio of bio-heptanoic acid to glycerin is preferably from about 0.4 to about 1.0 and more preferably from about 0.4 to about 0.6. In some embodiments, the ratio of bio-heptanoic acid to glycerin is about 0.5.

The reaction is conducted by charging glycerin and bio-heptanoic acid to a reaction vessel and heating under an inert atmosphere, e.g., nitrogen, while providing adequate agitation to ensure thorough mixing of the reactants. The reaction is conducted at temperatures of about 75° C. to about 300° C., preferably about 150° C. to about 250° C., and most preferably about 175° C. to about 225° C. Upon reaching the desired reaction temperature, the reaction may be conducted under atmospheric pressure with an inert gas sparge or under vacuum to drive conversion to the ester via removal of the condensation byproduct, i.e., water. Esterification catalysts may be employed to improve reaction kinetics and reduce reaction time if desired. Examples of such catalysts include acid catalysts, e.g., methanesulfonic acid, ethanesulfonic acid, p-toluenesulfonic acid and the like, and transition metal catalysts, e.g., tetra n-butyl titanate, stannous octanoate, and the like. In preferred embodiments, the reaction is conducted without the aid of a catalyst.

In some embodiments, a $C_1$-$C_4$ ester of bio-heptanoic acid, e.g., methyl heptanoate or ethyl heptanoate, may be employed as a starting material. In such embodiments, the reaction proceeds as a transesterification of the heptanoate ester with biobased glycerin, with removal of the $C_1$-$C_4$ alcohols, e.g. methanol or ethanol, as condensation byproducts to drive the reaction to completion. Another transesterification route to the $C_7$ MGME compositions of the present invention is the transesterification of biobased glyceryl di- and/or triheptanoate esters, i.e., a glyceryl ester composition having an average degree esterification ≥2.0, with biobased glycerin to lower the average degree of glyceryl esterification to less than 1.5, preferably from about 0.7 to about 1.4. For example, biobased glyceryl triheptanoate, e.g., triheptanoin, may be transesterified with biobased glycerin to yield a composition comprising a distribution of mono-, di-, and triester coproducts as well as free glycerin.

The crude reaction product of the condensation of bio-heptanoic acid (or its simple esters) with biobased glycerin will comprise a mixture of free glycerin, glyceryl monoheptanoate, glyceryl diheptanoate, and glyceryl triheptanoate. Any method of glyceryl ester purification known to those skilled in the art may be employed to further refine the crude reaction product to obtain the $C_7$ MGME compositions of the present invention. For example, the crude reaction product may be subjected to steam stripping under vacuum to remove unreacted bio-heptanoic acid or volatile byproducts that could impart undesirable odors to the composition. The crude reaction product may also be extracted, i.e. washed, with solvents to remove certain fractions of the reaction product. For example, extraction with water may be employed to remove unreacted glycerin from the $C_7$ MGME composition. In some embodiments, ionic salts, such as sodium chloride, potassium chloride, calcium chloride, and the like, may be added to the aqueous extraction phase to facilitate phase separation of the glycerin-rich aqueous and ester-rich organic layers. Extraction and separation processes may be enhanced via heating, mixing, centrifugation, etc. Following separation of the ester-rich organic layer from the glycerin-rich aqueous phase, the organic layer may be dried via application of heat, vacuum, and/or inert gas sparging to remove any residual water.

The $C_7$ MGME compositions of the present invention may be further fractionated to increase the monoester content in the composition. Techniques such as molecular distillation, e.g. short path distillation, wiped film distillation, etc. may be used to remove unreacted glycerin and separate the monoester from the heavier di- and triester coproducts. The $C_7$ MGME compositions may also be refined via treatment with processing aids, e.g. activated carbon, diatomaceous earth, etc., and filtration to improve properties such as color and odor.

Another route to glyceryl esters that may be employed to synthesize the $C_7$ MGME compositions of the present invention is the reaction of bio-heptanoic acid with glycidol derived from biobased glycerin. In this reaction, nucleophilic attack of the epoxide ring of the glycidol results in ring-opening to yield the 2,3-dihydroxypropyl ester of heptanoic acid, i.e., glyceryl monoheptanoate, in very high yield with correspondingly low yields of di- and triester coproducts.

The biobased $C_7$ MGME compositions include glyceryl monoheptanoate in a range from about 60 wt % to about 98 wt %, e.g., from 65 wt % to 95 wt %, from 65 wt % to 85 wt %, or 65 wt % to 75 wt %. In terms of upper limits, the amount of glyceryl monoheptanoate can be less than 98 wt %, e.g., less than 95 wt %, less than 85 wt %, or less than 75 wt %. In terms of lower limits, the amount of glyceryl monoheptanoate can be greater than 60 wt %, e.g., greater than 65 wt %.

In some embodiments, the inventive compositions comprise controlled amounts of glyceryl diheptanoate and/or glyceryl triheptanoate. The biobased $C_7$ MGME compositions include glyceryl diheptanoate in a range from about 1 wt % to about 40 wt %, e.g., from 1 wt % to 30 wt %, from 2 wt % to 30 wt %, from 2.5 wt % to 30 wt %, or 5 wt % to 25 wt %. In terms of upper limits, the amount of glyceryl diheptanoate can be less than 40 wt %, e.g., less than 35 wt %, less than 30 wt %, or less than 25 wt %. In terms of lower limits, the amount of glyceryl diheptanoate can be greater than 1 wt %, e.g., greater than 2 wt %, greater than 2.5 wt %, or greater than 5 wt %.

The biobased $C_7$ MGME compositions include glyceryl triheptanoate in a range from about 0 wt % to about 10 wt %, e.g., from 0 wt % to 6 wt %, from 0 wt % to 4 wt %, or 1 wt % to 4 wt %. In terms of upper limits, the amount of glyceryl triheptanoate can be less than 10 wt %, e.g., less than 6 wt %, less than 4 wt %, or less than 2 wt %. In terms of lower limits, the amount of glyceryl triheptanoate can be greater than 0 wt %, e.g., greater than 1 wt %.

The biobased $C_7$ MGME compositions include a total combined amount of glyceryl diheptanoate and glyceryl triheptanoate in a range from about 2 wt % to about 40 wt %, e.g., from 2 wt % to 35 wt %, from 2 wt % to 30 wt %, or from 2 wt % to 25 wt %. In terms of upper limits, the total combined amount of glyceryl diheptanoate and glyceryl triheptanoate can be less than 40 wt %, e.g., less than 35 wt %, less than 30 wt %, or less than 25 wt %. In terms of lower limits, the total combined amount of glyceryl diheptanoate and glyceryl triheptanoate can be greater than 2 wt %, e.g., greater than 3 wt %, greater than 4 wt %, or greater than 5 wt %.

The biobased $C_7$ MGME compositions include glycerol in a range from about 0 wt % to about 30 wt %, e.g., from 1 wt % to 30 wt %, from 2 wt % to 20 wt %, from 2 wt % to 15 wt %, or 2 wt % to 10 wt %. In terms of upper limits, the amount of glycerol can be less than 30 wt %, e.g., less than 20 wt %, less than 15 wt %, or less than 10 wt %. In terms of lower limits, the amount of glycerol can be greater than 0 wt %, e.g., greater than 1 wt %, or greater than 2 wt %. In some embodiments, the inventive compositions are substantially free of glycerol (i.e., contain less than about 2% by weight, preferably less than about 1% by weight, or most preferably less than 0.5% by weight of glycerol in the compositions).

The degree of esterification (DE) of a MGME composition may be referred to by persons in the relevant art as an average glyceryl DE, wherein the average glyceryl DE is the ratio of the number of glyceryl ester groups in the composition to the sum of the number of glyceryl ester groups plus the number of unesterified hydroxyl groups, multiplied by three, the total number of hydroxyl groups available for esterification on a glycerol molecule. Thus, unesterified glycerol has a DE of zero, and a glyceryl triester (triglyceride) has a DE of three. The average glyceryl DE may also be calculated based on weighted average of glycerol, glyceryl monoester (monoglyceride), glyceryl diester (diglyceride), and glyceryl triester (triglyceride) present in a MGME composition. The inventive compositions can be tuned to have a desired average glyceryl DE suitable for any particular formulation or application. In some embodiments, the inventive compositions have an average glyceryl degree of esterification of about 0.7 to about 1.4, about 0.8 to about 1.4, about 0.9 to about 1.4, about 1.0 to about 1.4, about 0.9 to about 1.3, or about 1.0 to about 1.3. In terms of upper limits, the average glyceryl degree of esterification can be less than 1.4, e.g., less than 1.3, less than 1.2, or less than 1.1. In terms of lower limits, the average glyceryl degree of esterification can be greater than 0.7, e.g., greater than 0.8, greater than 0.9, or greater than 1.0.

In some embodiments, the alkyl portion of the glyceryl ester acyl side chains $R_1$, $R_2$, and $R_3$ present in the inventive compositions are preferably linear. In some embodiments the alkyl portion of the glyceryl ester acyl side chains $R_1$, $R_2$, and $R_3$ present in the inventive compositions are at least 95% linear, at least 98% linear, or at least 99% linear. In some embodiments the glyceryl ester side chains present in the inventive compositions are substantially devoid of branched $R_1$, $R_2$, or $R_3$ groups.

The inventive compositions have superior optical, odor, and skin sensitivity properties compared to other compositions, and in particular other glyceryl ester compositions.

Formulations. The compositions of the present invention may be incorporated into many consumer and industrial end formulations, for example, formulations for personal care, home & institutional care, pharmaceutical, veterinary care, oral care, textile care, metalworking, food processing, and industrial applications. In an embodiment of the invention, the biobased $C_7$ MGME composition or a composition comprising the biobased $C_7$ MGME composition is incorporated into a formulation such as a personal care formulation. Embodiments include incorporation into a formulation with at least one other ingredient. Suitable formulations and additive ingredients known to those skilled in the art are described in the International Cosmetic Ingredient Dictionary and Handbook, 16th Edition published by the Personal Care Products Council, Washington, DC, or online in the Personal Care Products Council On-Line INFOBASE (http://online.personalcarecouncil.org). Formulations and ingredients may include, but are not limited to: water, surfactants, including anionic, cationic, nonionic, and zwitterionic surfactants, emulsifiers, emollients, humectants, conditioning agents for hair, skin or nails, chelating agents, active agents, bleaching or whitening agents, pH adjusting agents, fragrances, colorants, exfoliating agents, antioxidants, botanical ingredients, e.g., plant extracts, mica, smectite, thickeners, rheology modifiers, cannabinoids, oils, dyes, waxes, amino acids, nucleic acids, vitamins, hydrolyzed proteins and derivatives thereof, glycerin and derivates thereof, enzymes, anti-inflammatory and other medicaments, microbiocides, antifungals, antiseptics, antioxidants, UV absorbers, dyes and pigments, preservatives, sunscreen active agents, antiperspirant active agents, oxidizers, pH balancing agents, moisturizers, peptides and derivatives thereof, anti-aging actives, hair growth promoters, anti-cellulite actives and the like acceptable for use in formulations for human use.

Formulations may comprise one or more biobased $C_7$ MGME compositions. In preferred embodiments, the type and amount of biobased $C_7$ MGME composition employed in embodiments of formulations will impart an antimicrobial or microbiostatic effect in the formulation to preserve the formulation against contamination by microorganisms and/or improve antimicrobial efficacy on surfaces—e.g., skin, hair, etc. Thus, one embodiment includes a formulation comprising at least one biobased $C_7$ MGME composition and at least one other ingredient. A further aspect of the present invention encompasses a method of attenuating microbial contamination comprising blending an effective amount of at least one entirely biobased $C_7$ MGME composition with at least one other ingredient to form a microbiostatic concentrate (MBC), which may be added to formulations to preserve the formulation against contamination by microorganisms and/or to improve antimicrobial efficacy on surfaces. Embodiments of the formulations and/or MBCs include a biobased $C_7$ MGME composition comprising a biobased MGME of Formula (I):

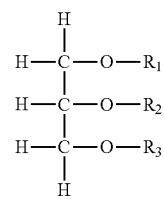

wherein $R_1$, $R_2$, and $R_3$ are independently —H or —C(O)—$C_6$ alkyl (e.g., n-heptanoyl).

The inventive biobased $C_7$ MGME compositions can be present in a formulation at a concentration of about 0.05% to about 10% by weight of the formulation. The amount of biobased $C_7$ MGME composition can, for example, be present in a formulation, such as in a formulation for a personal care product, in a range from about 0.05 wt % to about 10 wt %, e.g., from 0.1 wt % to 5 wt %, from 0.25 wt % to 4 wt %, or from 0.25 wt % to 2.5 wt %. In terms of upper limits, the amount of biobased $C_7$ MGME composition can be less than 10 wt %, e.g., less than 5 wt %, less than 4 wt %, or less than 2.5 wt %. In terms of lower limits, the amount of amount of biobased $C_7$ MGME composition can be greater than 0.05 wt %, e.g., greater than 0.1 wt %, greater than 0.2 wt %, or greater than 0.25 wt %. In certain embodiments, the inventive compositions are present in a formulation at a concentration of about 0.25% to about 2.5% by weight of the formulation.

Embodiments of formulations may take the form of, for example without limitation: solutions; conditioners for hair, nails, skin or textile; shampoo; hair spray; mustache/beard oils or waxes; hair-styling preparations; permanent wave liquids; hair colorants; glazes; skin lotions; face & body washes; makeup removers; cleansing lotions; emollient lotions/creams; bar soaps; shaving creams; sunscreens; sunburn treatments; deodorants; moisturizing gels; shaving foams; face powders; foundations; lipsticks, blushes; eyeliners; wrinkle and anti-aging creams; eye shadows; eyebrow pencils; mascaras; mouthwashes; toothpastes; oral care compositions; skin cleansing compositions; textile cleansing compositions; dish cleaning compositions; hair or fur cleansing compositions; deodorants or antiperspirants; decorative cosmetics; or hair styling compositions. Certain embodiments may also include a micellar solution comprising water and at least one surfactant or an oil-in-water emulsion, and further include other forms that may be suitable to deliver the entirely biobased $C_7$ MGME composition for use, such as aqueous solutions or dispersions or nonaqueous solutions or solid/semisolid mixtures.

Formulations and methods of preservation and attenuating microbial contamination as described herein can have a pH value, for example, in a range from about 2 to about 10, e.g., from 3 to 9, or from 4 to 8. In terms of upper limits, the pH value can be less than 10, e.g., less than 9, less than 7, less than 6.5, less than 6, or less than 5.6. In terms of lower limits, the pH value can be greater than 2, e.g., greater than 3, greater than 4, or greater than 5. In certain embodiments, the pH value is preferably less than about 6.5, more preferably less than about 6, and most preferably less than about 5.6.

Boosters. In some embodiments, the formulations of the present invention can contain a booster, which is a compound that can be added to enhance the antimicrobial and/or preservative efficacy of a biobased $C_7$ MGME composition, for example by enhancing the bacteriostatic and/or fungistatic activity of the biobased $C_7$ MGMEs. Boosters suitable for use with the compositions of the present invention include but are not limited to polyols, glyceryl ethers, chelating agents, and combinations thereof, all of which are preferably biobased.

Suitable polyols include but are not limited to $C_3$ to $C_{10}$ diols, which can include 1,2-alkanediols, 2,3-alkanediols, and mixtures thereof. In some embodiments, the one or more polyols includes a vicinal $C_3$ to $C_{10}$ diol, also known as medium chain terminal diols. Non-limiting representative examples of polyols for use with the compositions of the present invention include glycerin, propanediol, 1,2-propanediol, 1,2-butanediol, 1,3-butanediol, 1,4-butanediol, 2,3-butanediol, 1,2-hexanediol, 1,2-heptanediol, 2,3-octanediol, caprylyl glycol, decylene glycol, sorbitol, sorbitan, and the like, and mixtures thereof.

Suitable glyceryl ethers are typically monoethers of glycerol with one or more $C_6$ to $C_{10}$ alkyl groups. Non-limiting representative examples of glyceryl ethers for use with the compositions of the present invention include hexylglycerin, cyclohexylglycerin, heptylglycerin, caprylyl glyceryl ether, methylheptylglycerin, ethylhexylglycerin, and the like, and mixtures thereof.

Chelating agents include but are not limited to biobased $C_6$ to $C_{10}$ alkylhydroxamic acids and their corresponding alkylhydroxamate salts, such as heptanohydroxamic acid, caprylohydroxamic acid (caprylhydroxamic acid), pelargohydroxamic acid, caprohydroxamic acid, and mixtures thereof. Preferred is caprylohydroxamic acid (caprylhydroxamic acid) or its corresponding hydroxamate salt. Further non-limiting examples of chelating agents that may be used as boosters include tetrasodium glutamate diacetate, citric acid/citrate salts, phytic acid/phytate salts, gluconic acid/gluconate salts, galacturonic acid/galacturonate salts, and galactaric acid/galactarate salts, and mixtures thereof.

Boosters may also include organic acids, such as benzoic acid, sorbic acid, p-anisic acid, levulinic acid, salicylic acid, citric acid, lactic acid, succinic acid, malonic acid, malic acid, fumaric acid, anisic acid, glycolic acid, salts thereof, and combinations thereof. Other boosters include medium chain ($C_6$-$C_{10}$) fatty amides of the amino acid glycine, e.g. capryloyl glycine, or salts thereof.

The booster can be present in a range from about 0.05 wt % to about 15 wt % (based upon total weight of the formulation), e.g., from 0.075 wt % to 10 wt %, or from 0.1 wt % to 5 wt %. In terms of upper limits, the amount of booster can be less than 15 wt %, e.g., less than 10 wt %, or less than 5 wt %. In terms of lower limits, the amount of booster can be greater than 0.05 wt %, e.g., greater than 0.75 wt %, or greater than 0.1 wt %.

Relatedly, a booster can present in a formulation that contains a microbiostatic concentrate of the present invention.

Microbiostatic Concentrates. Blends of $C_7$ MGMEs including boosters as described may also be prepared as microbiostatic concentrates (MBCs) for addition to compositions to protect against microbial contamination and growth. The MBCs include at least the following ingredients: biobased $C_7$ MGME compositions as described above and at least one of glycerin and a $C_3$-$C_4$ diol. $C_3$-$C_4$ diols may be selected from propanediol, 1,2-propanediol (propylene glycol), 1,3-propanediol, 1,2-butanediol, 1,3-butanediol, 2,3-butanediol, 1,4-butanediol, methylpropanediol, and combinations thereof.

The MBCs may include from about 30 wt % to about 85 wt % of the inventive biobased $C_7$ MGME compositions and at least one of glycerin or a $C_3$-$C_4$ diol, for example, from about 5 wt % to about 50 wt %. The MBCs include the biobased $C_7$ MGME composition, including the compounds of Formula (I), in a range from about 30 wt % to about 85 wt %, e.g., from 35 wt % to 80 wt %, from 40 wt % to 80 wt %, or from 45 wt % to 75 wt %. In terms of upper limits, the amount of the biobased $C_7$ MGME composition can be less than 85 wt %, e.g., less than 80 wt %, or less than 75 wt %. In terms of lower limits, the amount of the biobased $C_7$ MGME composition can be greater than 30 wt %, e.g., greater than 35 wt %, or greater than 40 wt %, or greater than 45 wt %.

The MBCs include glycerin, $C_3$-$C_4$ diol, or a combination thereof in a range from about 1 wt % to about 75 wt % e.g., from 1 wt % to 70 wt %, from 2.5 wt % to 50 wt %, from 5 wt % to 50 wt %, or from 5 wt % to 25 wt %. In terms of upper limits, the amount of the at least one of glycerin and a $C_3$-$C_4$ diol can be less than 75 wt %, e.g., less than 70 wt %, less than 50 wt %, or less than 25 wt %. In terms of lower limits, the amount of the at least one of glycerin and a $C_3$-$C_4$ diol can be greater than 1.0 wt %, e.g., greater than 2.5 wt %, or greater than 5 wt %.

In some embodiments, the MBCs optionally include from about 0.1 wt % to about 20 wt % medium chain alkylhydroxamic acid, a salt thereof, or combinations thereof. The MBCs may include a medium chain alkylhydroxamic acid, a salt thereof, or combinations thereof in a range from about 0.1 wt % to about 25 wt % e.g., from 1.0 wt % to 20 wt %, from 2.5 wt % to 20 wt %, from 5.0 wt % to 17.5 wt %, or from 5.0 wt % to 15 wt %. In terms of upper limits, the amount of medium chain alkylhydroxamic acid, a salt thereof, or combinations thereof can be less than 25 wt %, e.g., less than 20 wt %, less than 17.5 wt %, or less than 15 wt %. In terms of lower limits, the amount of medium chain alkylhydroxamic acid, a salt thereof, or combinations thereof can be greater than 0.1 wt %, e.g., greater than 1.0 wt %, greater than 2.5 wt %, or greater than 5.0 wt %.

Other optional ingredients may be included in the MBCs as described below. MBCs may optionally contain any of the other booster compounds described above, including but not limited to glyceryl ethers, organic acids, chelating agents, and combinations thereof, all of which are preferably biobased. In some embodiments, the MBC is substantially anhydrous, i.e. there is no water intentionally added to the MBC at the time of preparation, and the MBC contains less than about 2 wt % water, e.g., adventitious moisture from processing or absorption from the atmosphere.

The MBCs can then be used in a subsequent formulation, such as in a formulation for a personal care product. The amount of MBC can, for example, be present in a formulation in a range from about 0.1 wt % to about 10 wt % e.g., from 0.25 wt % to 7.5 wt %, from 0.5 wt % to 5 wt %, or from 0.75 wt % to 2.5 wt %. In terms of upper limits, the amount of MBC can be less than 10 wt %, e.g., less than 7.5 wt %, less than 5 wt %, or less than 2.5 wt %. In terms of lower limits, the amount of amount of MBC can be greater than 0.1 wt %, e.g., greater than 0.25 wt %, greater than 0.5 wt %, or greater than 0.75 wt %.

Formulations comprising MBCs as described herein can have a pH value, for example, in a range from about 2 to about 10, e.g., from 3 to 9, from 4 to 8, from 5 to 8, from 5.5 to 7.5, or from 6 to 7. In terms of upper limits, the pH value can be less than 10, e.g., less than 9, less than 8, less than 7.5 or less than 7. In terms of lower limits, the pH value can be greater than 2, e.g., greater than 3, greater than 4, greater than 5, greater than 5.5, or greater than 6. In certain embodiments, the pH value is from about 5 to about 8, preferably from about 5.5 to about 7.5, or more preferably from about 6 to about 7.

The formulations containing the inventive biobased $C_7$ MGME compositions or inventive MBCs can have superior microbial resistance or preservation. In some embodiments, a formulation containing the inventive composition is substantially preserved against microbial contamination for a period of at least 12 months, at least 18 months, or at least 24 months. Embodiments of formulations and/or compositions and methods of preservation and attenuating microbial contamination may further include reducing microbes by 90% within a week to a month. In some embodiments, the compositions of the present invention can be used to reduce microbes within a formulation by at least 90% within seven days. In some embodiments, the invention comprises a method of adding the compositions to a formulation thereby reducing or eliminating 99% of bacteria within seven days, and/or reducing or eliminating 90% of yeast and fungi from the formulation within seven days.

In some embodiments, a formulation containing the inventive composition surprisingly exhibits preservation against microbial contamination to a substantially similar degree compared to a formulation containing the same amount or concentration of a $C_8$ to $C_{14}$ glyceryl ester (such as glyceryl caprylate). In other words, the formulation has equal or superior preservation against microbial contamination compared to a reference formulation containing a $C_8$ to $C_{14}$ MGME composition in the same concentration by weight as the $C_7$ biobased monoglyceryl monoester as described herein is present in the formulation.

In some embodiments, a formulation containing the inventive composition exhibits superior optical clarity as measured by nephelometric turbidimetry compared to a formulation containing the same amount or concentration of a $C_8$ to $C_{14}$ glyceryl ester (such as glyceryl caprylate). In some embodiments, a formulation containing the inventive composition has a tunable turbidity. Turbidity can be measured by known methods in the art, such as those described in ISO 7027 (©2016, International Organization for Standardization) and by using instruments such as an HF Scientific Micro 100 Benchtop Turbidity Meter operating at room temperature (23° C.±2° C.). In some embodiments, a formulation comprising a composition of the present invention has a turbidity value less than about 100 Nepelometric Turbidity Units ("NTU"), less than about 75 NTU, less than about 50 NTU, less than about 25 NTU, or less than about 10 NTU as measured by ISO 7027 or similar method. In some embodiments, formulations including the $C_7$ biobased monoglyceryl monoester as described herein may have a turbidity of less than about 10 nephelometric turbidity units (NTU). Turbidity is important so that the formulations can readily be formulated into end-use products that are intended to be clear or transparent. Thus, the turbidity of the formulations herein should be as low as possible for a given formulation.

EXAMPLES

Example 1. Comparison of Bio-Heptanoic Acid with Petro-Heptanoic Acid

Confirmation of $C_7$ heptanoic acid source was achieved by $^{14}C$ radiocarbon dating as well as via chromatographic analysis to determine content of branched impurities, which are only present in petro-heptanoic acid (i.e., non-biobased/non-renewable heptanoic acid).

$^{14}C$ radiocarbon dating according to ASTM D6866 indicated that bio-heptanoic acid derived from castor oil (Oleris® n-Heptanoic Acid from Arkema), contained 100% biobased carbon, whereas petro-heptanoic acid derived from the hydroformylation of 1-hexene followed by oxidation to the $C_7$ acid (n-Heptanoic Acid from Oxea), contained 0% biobased carbon.

Samples of bio-heptanoic acid and petro-heptanoic acid were reacted with methanol in the presence of boron trifluoride ($BF_3$) to yield the methyl ester derivatives of the alkanoic acids. The resulting methyl ester compositions were then extracted into heptane and analyzed by gas chromatography using the total Fatty Acid Methyl Ester (FAME) method based on AOCS Official Method Ce 1h-05. A Thermo Electron 1310 Gas Chromatograph equipped with an FID detector and Chromeleon software vers. 7.2.10 and a Restek MX-5 column (0.53 mm ID, 30 m, 0.5 µm film thickness) was utilized. The injector and detector temperatures were 300° C., with an initial temperature of 100° C., a final temperature of 300° C., and a heating rate of 8° C./minute. The injection volume was 1.0 µL with a He carrier flow of 5 mL/min and a split injection flow of 10 mL/min.

GC analysis revealed that bio-heptanoic acid is comprised of greater than 99% linear $C_7$ fatty acid and contains only a trace (ca. 0.1%) of linear $C_6$ fatty acid as an impurity. By contrast, petro-heptanoic acid, comprises a significant level of a branched $C_7$ alkanoic acid impurity, 2-methylhexanoic acid, which is present at ca. 2.9%.

TABLE 1

Characterization of Bio- and Petro-Heptanoic Acids (Example 1)

| | bio-heptanoic acid | petro-heptanoic acid |
|---|---|---|
| n-Heptanoic acid content (%)† | 99.88 | 97.14 |
| Impurities (%)† | | |
| n-hexanoic acid | 0.12 | — |
| 2-methylhexanoic acid | — | 2.86 |
| Biobased carbon content (%)‡ | 100 ± 1 | 1 ± 6 |

†reported as relative peak area from GC analysis of methyl ester derivative.
‡as measured by ASTM D6866.

Example 2. Synthesis of $C_7$ MGME Composition GH70

To a 22-liter four-neck round bottom flask equipped overhead mechanical stirrer and temperature controller and under a nitrogen sparge were added glycerin (9669 g, 105.1 mol) and bio-heptanoic acid (Oleris® n-Heptanoic Acid, Arkema, 6831 g, 52.55 mol). The contents of the flask were heated to 200° C. while stirring at moderate speed. After holding the reaction at 200° C. for 2 hr, vacuum was applied to the system to remove condensation water. The reaction proceeded until desired conversion was achieved (as indicated by an Acid Value of <1.0 mg KOH/g), which took approximately 9 hr. The reactor was then cooled to 80° C. At 80° C. and under 5 mm Hg vacuum, steam was sparged into the reactor for 2 hr. After the steam stripping, the reactor was then cooled to 70° C. under 5 mm Hg vacuum. The reactor was then brought to atmospheric pressure and the contents discharged into a holding container for further processing.

An equal amount of deionized (DI) water was added to the reaction contents, the mixture heated to 85-90° C., and mixed vigorously for 15 min. Mixing was stopped, and the mixture was allowed to separate into two layers. The bottom aqueous layer containing free glycerin was removed and saved for glycerin recovery. The washing procedure was repeated using the same amount of DI water as in the first separation, with the addition of 0.5% potassium chloride. In this second separation, the bottom aqueous layer was discarded. The organic phase, (top layer), was charged to a 4-neck round bottom glass flask, heated to 90° C., and dried under 5 mm Hg vacuum, while mixing at low-medium speed for 5 hr. The reactor product was then cooled to room temperature and discharged to an appropriate container for storage.

The resulting biobased glyceryl heptanoate MGME composition contained 70.4 wt % glyceryl monoheptanoate, 25.1 wt % glyceryl diheptanoate, 2.9 wt % glyceryl triheptanoate, and 1.2 wt % free glycerin. The product of Example 2 is referred to as GH70, nominally indicating a glyceryl heptanoate MGME composition comprising ca. 70 wt % glyceryl monoheptanoate ester and having an average glyceryl degree of esterification=1.29.

Example 3. Preparation of $C_7$ MGME Composition GH90

The GH70 product of Example 2 was charged to a feed flask and fed into a wiped film evaporator operating at 140° C. and under 1 mm Hg vacuum. The GH70 product was fractionated to yield a $C_7$ MGME composition comprising 91.7 wt % glyceryl monoheptanoate, 6.2 wt % glyceryl diheptanoate, and 0 wt % glyceryl triheptanoate. Example 3 is referred to as GH90, nominally indicating a glyceryl heptanoate MGME composition comprising ca. 90 wt % glyceryl monoheptanoate ester and having an average glyceryl degree of esterification=1.04.

Comparative Examples 2 & 3. Preparation of $C_8$ MGME Compositions GC70 and GC90

Methods analogous to those described in Examples 2 and 3 were used to prepare $C_8$ MGME compositions; however, biobased $C_8$ caprylic acid was substituted for the bioheptanoic acid. The resulting comparative examples were as follows:

Comparative Example 2

GC70 (nominally ca. 70 wt % glyceryl monocaprylate ester), a $C_8$ MGME composition comprising 72.0 wt % glyceryl monocaprylate, 22.9 wt % glyceryl dicaprylate, 2.1 wt % glyceryl tricaprylate, and 1.3 wt % free glycerin, and having an average glyceryl degree of esterification=1.22.

Comparative Example 3

GC88 (nominally ca. 88 wt % glyceryl monocaprylate ester), a $C_8$ MGME composition comprising 89.2 wt % glyceryl monocaprylate, 7.7 wt % glyceryl dicaprylate, 0.1 wt % glyceryl tricaprylate, and 2.9 wt % free glycerin, and having an average glyceryl degree of esterification=1.05.

Example 4. Improved Skin Mildness of $C_7$ MGME Compositions

The skin mildness of MGME compositions was evaluated using the MatTek EpiDerm™ Skin Irritation Test (OECD TG 439), which uses the MTT assay to measure cell viability of 3-D skin tissue equivalents exposed to aqueous solutions of MGME compositions as a function of time. Additional experimental details of the assay are described in publications by Faller, et al. (Predictive ability of reconstructed human epidermis equivalents for the assessment of skin irritation of cosmetics, *Tox. In Vitro,* 2002, 16(5), 557-572.) and Walters, et al. (In Vitro Assessment of Skin Irritation Potential of Surfactant-based Formulations by Using a 3-D Skin Reconstructed Tissue Model and Cytokine Response, *Altern. Lab Anim.,* 2016, 44(6), 523-532.) Cell viability as a function of time is a measure of cytotoxicity and is correlated to the irritation potential of a chemical composition. The exposure time at which 50% of cell viability remains, known as the $ET_{50}$ value, is a characteristic metric that is indicative of skin irritation potential. The higher the $ET_{50}$ value of a chemical composition, the less cytotoxic the composition will be; thus, compositions with higher $ET_{50}$ values are considered to be less irritating than compositions with lower $ET_{50}$ values.

TABLE 2

Cell viability as a function of time and $ET_{50}$ values for MGME compositions

| | Ex 2—GH70 | | Ex 3—GH90 | | Comp. Ex 2—GC70 | | Comp. Ex 3—GC88 | |
|---|---|---|---|---|---|---|---|---|
| Exposure Time (hr) | Cell Viability (%) | S.D. (± %) | Cell Viability (%) | S.D. (± %) | Cell Viability (%) | S.D. (± %) | Cell Viability (%) | S.D. (± %) |
| 1 | — | — | — | — | — | — | 49.3 | 7.5 |
| 4 | 101.2 | 4.0 | 94.1 | 7.8 | 81.9 | 4.1 | 64.1 | 5.0 |
| 8 | 98.4 | 6.2 | 78.5 | 8.7 | 65.7 | 0.2 | 43.5 | 8.8 |
| 16 | 93.8 | 2.1 | 59.6 | 8.2 | 60.1 | 17.7 | — | — |
| 24 | 93.4 | 3.5 | 56.9 | 3.4 | 40.3 | 1.6 | 30.9 | 3.1 |
| $ET_{50}$ (hr) | >24 | | >24 | | 20.1 | | <1 | |

Table 2 lists the cell viability values as a function of exposure time to 1.0 wt % solutions of the MGME compositions of Examples 2 and 3 and Comparative Examples 2 and 3; also listed are the $ET_{50}$ values calculated from the data. As used in Table 2, "S.D." refers to relative Standard Deviation, which was calculated from cell viability (%) values assessed by conducting two experiments per tissue sample using each exemplary and comparative composition from Examples 2-3 and Comparative Examples 2-3.

FIG. 1 graphically depicts the cell viability values as a function of the exposure time. Note that due to the significantly greater cytotoxicity of Comparative Example 3, an exposure time of 1 hr was substituted for the 16 hr exposure time in an effort to obtain data more amenable to accurate calculation of an $ET_{50}$ value.

The $C_7$ MGME compositions of Examples 2 and 3 (GH70 and GH90) demonstrate remarkably higher cell viabilities at all exposure times when compared to the corresponding $C_8$ MGME compositions of Comparative Examples 2 and 3 (GC70 and GC88). This is rather surprising considering the compositions differ by only one methylene (—$CH_2$—) unit in the fatty acyl chain. The $ET_{50}$ values for Examples 2 and 3 are both greater than 24 hr, whereas Comparative Examples 2 and 3 exhibit $ET_{50}$ values of 20.1 hr and <1 hr, respectively, indicating that $C_8$ MGME compositions of Comparative Examples 2 and 3 possess significantly greater irritation potential compared to the $C_7$ MGME compositions.

The data in Table 1 and FIG. 1 also demonstrate that cytotoxicity and irritation potential decrease when the MGME compositions possess lower values of monoester content and a correspondingly increased fraction of di- and triester content. For example, Example 2 (GH70) exhibits greater cell viability values at all time points compared to Example 3 (GH90), indicating lower cytotoxicity and irritation potential for the MGME composition comprising higher levels of di- and triester. A similar trend is observed in Comparative Examples 2 and 3 for the $C_8$ MGME compositions. Thus, MGME compositions comprising extremely high values of monoester content (greater than ca. 90% monoester) are less desirable in terms of reducing skin irritation potential.

Example 5. Micellar Water Formulation Comprising $C_7$ MGME Composition

Comparative Example 4—Micellar Water Formulation without $C_7$ MGME Composition

Comparative Example 4 was prepared according to the procedure used for Example 5, only glyceryl heptanoate was omitted from the formula.

Comparative Example 5. Micellar Water Formulation Comprising $C_8$ MGME Composition Comparative Example 5 was prepared according to the procedure used for Example 5, only glyceryl caprylate (GC70, Comparative Example 2) was substituted for glyceryl heptanoate.

Visual observation of the micellar water formulations revealed that the addition of the $C_7$ MGME composition maintained the clarity of the formulation, whereas the addition of the comparative $C_8$ MGME composition resulted in a hazy formulation. Turbidity measurements were conducted using a Thermo Scientific™ Orion™ AQUAfast AQ3010 Turbidity Meter and turbidity values reported as nephelometric turbidity units (NTU) and were observed to correlate with the visual observations of formulation appearance.

Microbiological Challenge Testing (MCT) of Micellar Water Formulations to Determine Preservative Efficacy:

A challenge test complying with the USP and PCPC compendial test methodologies was performed to determine the preservative efficacy of the formulations in Table 3. (Refer to Personal Care Products Council Technical Guide-

TABLE 3

Micellar water formulations of Example 5 and Comparative Examples 4-5

| Ingredient (INCI) | Trade Name (Supplier) | Formula Wt % (as supplied) | | |
|---|---|---|---|---|
| | | Comp Ex 4 | Comp Ex 5 | Ex 5 |
| Water | Purified Water | Q.S. to 100 wt % | Q.S. to 100 wt % | Q.S. to 100 wt % |
| Polysorbate 20 | Polysorbate 20 (Making Cosmetics) | 2.00 | 2.00 | 2.00 |
| Butylene Glycol | Butylene Glycol (Univar Solutions) | 0.30 | 0.30 | 0.30 |
| Glyceryl Heptanoate | GH70 - Ex 1 | — | — | 1.00 |
| Glyceryl Caprylate | GC70 - Comp Ex 2 | — | 1.00 | — |
| pH Adjusters | | | | |
| Sodium Hydroxide | Sodium Hydroxide (Sigma-Aldrich), 10% aq. solution | Q.S. to pH 5.2-5.6 | Q.S. to pH 5.2-5.6 | Q.S. to pH 5.2-5.6 |
| Citric Acid | Citric acid (Sigma-Aldrich), 20% aq. solution | Q.S. to pH 5.2-5.6 | Q.S. to pH 5.2-5.6 | Q.S. to pH 5.2-5.6 |
| | Appearance | Clear | Hazy | Clear |
| | Turbidity (NTU) | 0.90 | 348 | 2.25 |

A micellar water was prepared according to the formulation in Table 3 using the following procedure: Water was charged to an appropriately sized beaker equipped with overhead mechanical stirrer and anchor-type blade. Mixing was started at low-medium speed and polysorbate 20, butylene glycol, and glyceryl heptanoate (GH70, Example 1) were added to the batch and mixed until a clear, homogenous solution was formed. Citric acid (20% aqueous solution) and sodium hydroxide (10% aqueous solution) were used to adjust the batch pH to 5.4±0.2. The batch was mixed until uniform and then discharged to an appropriate container for storage.

lines, Microbiology Guidelines, 2018 Edition published by the Personal Care Products Council, Washington, DC and reference cited therein.) The results are shown in Table 4A-C. The tables indicate the log value of the number of viable organisms measured after the expired time interval. The row titled "Inoculum Level" indicates the initial number of organisms present at the start of the test.

Comparative Example 4, containing no MGME composition, fails to meet the USP 51 and PCPC acceptance criteria for reduction in bacteria within seven days. Example 5 containing GH70 demonstrated equivalent preservative efficacy to Comparative Example 5 containing GH88, inhibiting growth of bacteria and yeast to meet the USP and PCPC acceptance criteria and inhibiting the growth of mold to meet the USP 51 acceptance criteria. The results for Example 5 and Comparative Example 5 demonstrate that the shorter $C_7$ acyl chain of the less irritating GH70 does not compromise the preservative efficacy of the MGME composition.

TABLE 4A

MCT data for Comparative Example 4
$Log_{10}$ CFU/g

| | Staphylococcus aureus | Esherichia coli | Pseudomonas aeruginosa | Candida albicans | Aspergillus brasiliensis |
|---|---|---|---|---|---|
| Inoculum Level | 6.02 | 6.03 | 6.03 | 5.03 | 5.00 |
| Day 2 | 4.70 | 5.00 | <2.00 | 5.00 | 3.08 |
| Day 7 | 2.48 | 5.00 | <2.00 | 5.00 | 3.08 |
| Day 14 | <2.00 | 5.00 | <2.00 | 5.00 | 3.08 |
| Day 21 | <2.00 | 5.00 | <2.00 | 5.00 | 3.08 |
| Day 28 | <2.00 | 5.00 | <2.00 | 5.00 | 3.00 |

TABLE 4B

MCT data for Comparative Example 5
$Log_{10}$ CFU/g

| | Staphylococcus aureus | Esherichia coli | Pseudomonas aeruginosa | Candida albicans | Aspergillus brasiliensis |
|---|---|---|---|---|---|
| Inoculum Level | 6.02 | 6.03 | 6.03 | 5.03 | 5.00 |
| Day 2 | <2.00 | <2.00 | <2.00 | <2.00 | 3.20 |
| Day 7 | <2.00 | <2.00 | <2.00 | <2.00 | 3.20 |
| Day 14 | <2.00 | <2.00 | <2.00 | <2.00 | 3.20 |
| Day 21 | <2.00 | <2.00 | <2.00 | <2.00 | 3.20 |
| Day 28 | <2.00 | <2.00 | <2.00 | <2.00 | 2.90 |

TABLE 4C

MCT data for Example 5
$Log_{10}$ CFU/g

| | Staphylococcus aureus | Esherichia coli | Pseudomonas aeruginosa | Candida albicans | Aspergillus brasiliensis |
|---|---|---|---|---|---|
| Inoculum Level | 6.02 | 6.03 | 6.03 | 5.03 | 5.00 |
| Day 2 | <2.00 | <2.00 | <2.00 | <2.00 | 3.26 |
| Day 7 | <2.00 | <2.00 | <2.00 | <2.00 | 3.26 |
| Day 14 | <2.00 | <2.00 | <2.00 | <2.00 | 3.00 |
| Day 21 | <2.00 | <2.00 | <2.00 | <2.00 | 3.00 |
| Day 28 | <2.00 | <2.00 | <2.00 | <2.00 | 3.00 |

Example 6. Natural Lotion Formulation Comprising $C_7$ MGME Composition GH70

A lotion comprising 100% biobased ingredients was prepared according to the formulation in Table 5 using the following procedure: Water and glycerin were charged to an appropriately sized beaker equipped with overhead mechanical stirrer and anchor-type blade and hotplate for heating. Mixing was started at low-medium speed and the xanthan gum was slowly sifted into the water phase and mixed until uniformly dispersed (no clumps remaining). The mixture was then heated to 80° C. In a separate beaker, the oil phase ingredients were combined and heated to 80° C. while mixing at low speed and mixed until uniform. The oil phase mixture was added to the water phase mixture at 80° C. while mixing at medium-high speed. Upon reaching a uniform appearance, the mixture was allowed to cool to ca. 75° C. and then homogenized at 3500 rpm for three minutes. Following homogenization, the mixture was allowed to cool to ca. 45-50° C. while stirring at medium speed. At 45-50° C., glyceryl heptanoate (GH70, Example 2) was added. Upon cooling to ambient temperature (23° C.±2° C.), citric acid (20% aqueous solution) was used to adjust the batch pH to 6.5±0.2. The batch was mixed until uniform and then discharged to an appropriate container for storage.

Example 7. Natural Lotion Formulation Comprising $C_7$ MGME Composition GH90

Example 7 was prepared according to the procedure used for Example 6, only the $C_7$ MGME composition of Example 3 (GH90) was substituted for GH70.

TABLE 5

Natural lotion formulations of Examples 6-7 and Comparative Examples 6-8

| | | Formula Wt % (as supplied) | | | | |
|---|---|---|---|---|---|---|
| Ingredient (INCI) | Trade Name (Supplier) | Ex 6 | Ex 7 | Comp Ex 6 | Comp Ex 7 | Comp Ex 8 |
| Oil Phase | | | | | | |
| Triheptanoin | SustOleo MCT (INOLEX) | 5.00 | 5.00 | 5.00 | 5.00 | 5.00 |
| Glyceryl Stearate SE | SustOleo GMS-SE (INOLEX) | 4.00 | 4.00 | 4.00 | 4.00 | 4.00 |
| Heptyl Undecylenate | LexFeel Natural (INOLEX) | 5.00 | 5.00 | 5.00 | 5.00 | 5.00 |
| Hydrogenated Rapeseed Oil | SustOleo TSB (INOLEX) | 3.00 | 3.00 | 3.00 | 3.00 | 3.00 |
| Water Phase | | | | | | |
| Water | Purified Water | Q.S. to 100 wt % | Q.S. to 100 wt % | Q.S. to 100 wt % | QS to 100% | Q.S. to 100 wt % |

TABLE 5-continued

Natural lotion formulations of Examples 6-7 and Comparative Examples 6-8

| Ingredient (INCI) | Trade Name (Supplier) | Formula Wt % (as supplied) | | | | |
|---|---|---|---|---|---|---|
| | | Ex 6 | Ex 7 | Comp Ex 6 | Comp Ex 7 | Comp Ex 8 |
| Glycerin | Glycerin, USP | 3.00 | 3.00 | 3.00 | 3.00 | 3.00 |
| Xanthan Gum | Keltrol CG-T (CP Kelco) | 0.30 | 0.30 | 0.30 | 0.30 | 0.30 |
| Glyceryl Heptanoate | GH70—Ex 1 | 1.30 | — | — | — | 1.30 |
| Glyceryl Heptanoate | GH90—Ex 2 | — | 1.00 | — | — | — |
| Glyceryl Caprylate | GC70—Comp Ex 2 | — | — | — | 1.30 | — |
| Glyceryl Caprylate | GC88—Comp Ex 3 | — | — | — | — | 1.00 |
| pH Adjuster | | | | | | |
| Citric Acid | Citric acid (Sigma-Aldrich), 20% aq. solution | Q.S. to pH 6.3-6.7 | Q.S. to pH 6.3-6.7 | Q.S. to pH 6.3-6.7 | Q.S. to pH 6.3-6.7 | Q.S. to pH 6.3-6.7 |

Comparative Example 6. Natural Lotion Formulation without MGME Composition

Comparative Example 6 was prepared according to the procedure used for Example 6, only no medium chain MGME composition was added to the formula.

Comparative Example 7. Natural Lotion Formulation Comprising $C_8$ MGME Composition GC70

Comparative Example 7 was prepared according to the procedure used for Example 6, only the $C_8$ MGME composition of Comparative Example 2 (GC70) was substituted for GH70.

Comparative Example 8. Natural Lotion Formulation Comprising $C_8$ MGME Composition GC88

Comparative Example 8 was prepared according to the procedure used for Example 6, only the $C_8$ MGME composition of Comparative Example 3 (GC88) was substituted for GH70.

Microbiological Challenge Testing (MCT) of Natural Lotion Formulations to Determine Preservative Efficacy:

A challenge test complying with the USP and PCPC compendial test methodologies was performed to determine the preservative efficacy of the formulations in Table 5. The results are shown in Tables 6A-E.

TABLE 6A

MCT data for Example 6.
$Log_{10}$ CFU/g

| | Staphylococcus aureus | Escherichia coli | Pseudomonas aeruginosa | Candida albicans | Aspergillus brasiliensis |
|---|---|---|---|---|---|
| Inoculum Level | 6.04 | 6.04 | 6.03 | 5.02 | 5.00 |
| Day 2 | <1.00 | <1.00 | <1.00 | <1.00 | 3.45 |
| Day 7 | <1.00 | <1.00 | <1.00 | <1.00 | 3.28 |
| Day 14 | <1.00 | <1.00 | <1.00 | <1.00 | 2.61 |
| Day 21 | <1.00 | <1.00 | <1.00 | <1.00 | 1.30 |
| Day 28 | <1.00 | <1.00 | <1.00 | <1.00 | 1.30 |

TABLE 6B

MCT data for Example 7.
$Log_{10}$ CFU/g

| | Staphylococcus aureus | Escherichia coli | Pseudomonas aeruginosa | Candida albicans | Aspergillus brasiliensis |
|---|---|---|---|---|---|
| Inoculum Level | 6.04 | 6.04 | 6.03 | 5.02 | 5.00 |
| Day 2 | <1.00 | <1.00 | <1.00 | <1.00 | 3.23 |
| Day 7 | <1.00 | <1.00 | <1.00 | <1.00 | 3.28 |
| Day 14 | <1.00 | <1.00 | <1.00 | <1.00 | <1.00 |
| Day 21 | <1.00 | <1.00 | <1.00 | <1.00 | <1.00 |
| Day 28 | <1.00 | <1.00 | <1.00 | <1.00 | <1.00 |

TABLE 6C

MCT data for Comparative Example 6.
$Log_{10}$ CFU/g

| | Staphylococcus aureus | Escherichia coli | Pseudomonas aeruginosa | Candida albicans | Aspergillus brasiliensis |
|---|---|---|---|---|---|
| Inoculum Level | 6.02 | 6.04 | 6.02 | 5.02 | 5.00 |
| Day 2 | 5.00 | 5.00 | 5.00 | 5.00 | 3.20 |
| Day 7 | 4.26 | 5.00 | 5.00 | 5.00 | 3.11 |
| Day 14 | 2.62 | 5.00 | 5.00 | 5.00 | 1.90 |
| Day 21 | <1.00 | 5.00 | 5.00 | 5.00 | <1.00 |
| Day 28 | <1.00 | 5.00 | 5.00 | 5.00 | <1.00 |

TABLE 6D

MCT data for Comparative Example 7.
$Log_{10}$ CFU/g

| | Staphylococcus aureus | Escherichia coli | Pseudomonas aeruginosa | Candida albicans | Aspergillus brasiliensis |
|---|---|---|---|---|---|
| Inoculum Level | 6.04 | 6.04 | 6.03 | 5.02 | 5.00 |
| Day 2 | <1.00 | <1.00 | <1.00 | <1.00 | 3.38 |
| Day 7 | <1.00 | <1.00 | <1.00 | <1.00 | 3.32 |
| Day 14 | <1.00 | <1.00 | <1.00 | <1.00 | 3.28 |
| Day 21 | <1.00 | <1.00 | <1.00 | <1.00 | 3.23 |
| Day 28 | <1.00 | <1.00 | <1.00 | <1.00 | 2.78 |

TABLE 6E

MCT for Comparative Example 8.
Log$_{10}$ CFU/g

| | Staphylococcus aureus | Escherichia coli | Pseudomonas aeruginosa | Candida albicans | Aspergillus brasiliensis |
|---|---|---|---|---|---|
| Inoculum Level | 6.04 | 6.04 | 6.03 | 5.02 | 5.00 |
| Day 2 | <1.00 | <1.00 | <1.00 | <1.00 | 3.80 |
| Day 7 | <1.00 | <1.00 | <1.00 | <1.00 | 2.70 |
| Day 14 | <1.00 | <1.00 | <1.00 | <1.00 | 2.56 |
| Day 21 | <1.00 | <1.00 | <1.00 | <1.00 | 2.32 |
| Day 28 | <1.00 | <1.00 | <1.00 | <1.00 | 2.26 |

Comparative Example 6 prepared without a medium chain MGME composition fails to demonstrate adequate preservative efficacy against bacteria and yeast and fail to meet the USP 51 and PCPC acceptance criteria, whereas the Examples 5-6 and Comparative Examples 7-8 prepared with medium chain MGME compositions achieve broad spectrum preservative efficacy against bacteria, yeast, and mold. Example 7 formulated with the $C_7$ MGME composition of Example 3 (GH90) demonstrated superior preservative efficacy against mold compared to Comparative Example 8 which was formulated with the $C_8$ MGME composition of comparable monoester content (GC88, Comparative Example 3).

Examples 8 and 9—Microbiostatic Concentrates (MBCs)

The MBCs shown in Table 7 were prepared by combining and mixing the specified amounts of each ingredient and mixing at 40-45° C. until uniform, homogeneous compositions were obtained.

TABLE 7

MBC compositions of Examples 8 and 9

| | | Formula Wt % (as supplied) | |
|---|---|---|---|
| Ingredient - INCI Name | Trade Name (Supplier) | Ex 8 | Ex 9 |
| Glyceryl Heptanoate | Lexgard Natural GH70 (INOLEX) | 70.0 | 45.0 |
| Caprylhydroxamic Acid | Spectrastat CHA (INOLEX) | 15.0 | 10.0 |
| Glycerin | Glycerine, non-palm vegetable, USP | 15.0 | — |
| Propanediol | Zemea Propanediol (DuPont Tate & Lyle) | — | 45.0 |
| | | 100.0 | 100.0 |

Examples 10 and 11—Preservation of Micellar Water Formulations with MBCs

The micellar water formulations shown in Table 8 for Examples 10 and 11 containing the MBCs of Examples 8 and 9, respectively, and Comparative Example 9 containing no MBC, were prepared according to the procedure described above (see Example 5).

TABLE 8

Micellar water formulations of Examples 10 - 11 and Comparative Example 9

| Ingredient (INCI) | Trade Name (Supplier) | Comp Ex 9 | Ex 10 | Ex 11 |
|---|---|---|---|---|
| Water | Purified Water | Q.S. to 100 wt % | Q.S. to 100 wt % | Q.S. to 100 wt % |
| Polysorbate 20 | Polysorbate 20 (Making Cosmetics) | 2.00 | 2.00 | 2.00 |
| Butylene Glycol | Butylene Glycol (Univar Solutions) | 0.30 | 0.30 | 0.30 |
| Glyceryl Heptanoate (and) Caprylhydroxamic Acid (and) Glycerin | MBC Example 8 | — | 1.00 | — |
| Glyceryl Heptanoate (and) Caprylhydroxamic Acid (and) Propanediol | MBC Example 9 | — | — | 1.00 |
| pH Adjusters | | | | |
| Sodium Hydroxide | Sodium Hydroxide (Sigma-Aldrich), 10% aq. solution | Q.S. to pH 6.3-6.7 | Q.S. to pH 6.3-6.7 | Q.S. to pH 6.3-6.7 |
| Citric acid | Citric Acid (Sigma-Aldrich), 20% aq. solution | Q.S. to pH 6.3-6.7 | Q.S. to pH 6.3-6.7 | Q.S. to pH 6.3-6.7 |

A microbiological challenge test complying with the USP and PCPC compendial test methodologies was performed to determine the preservative efficacy of the formulations in Table 8. The results are shown in Tables 9A-C. Comparative Example 9 prepared without a MBC composition fails to demonstrate adequate preservative efficacy against bacteria and yeast and failed to meet the USP 51 and PCPC acceptance criteria, whereas the Examples 10-11 prepared with MBC compositions achieve broad spectrum preservative efficacy against bacteria, yeast, and mold and meet the compendial acceptance criteria.

TABLE 9A

MCT data for Comparative Example 9.
$Log_{10}$ CFU/g

|  | Staphylococcus aureus | Escherichia coli | Pseudomonas aeruginosa | Candida albicans | Aspergillus brasiliensis |
|---|---|---|---|---|---|
| Inoculum Level | 5.88 | 5.94 | 5.94 | 5.77 | 5.70 |
| Day 2 | 4.11 | 4.57 | 5.00 | 5.00 | 3.50 |
| Day 7 | <1.00 | 4.76 | 5.00 | 5.00 | 3.20 |
| Day 14 | <1.00 | 4.55 | 5.00 | 5.00 | 3.18 |
| Day 21 | <1.00 | 4.48 | 5.00 | 5.00 | 3.18 |
| Day 28 | <1.00 | 4.43 | 5.00 | 5.00 | 2.78 |

TABLE 9B

MCT data for Example 10.
$Log_{10}$ CFU/g

|  | Staphylococcus aureus | Escherichia coli | Pseudomonas aeruginosa | Candida albicans | Aspergillus brasiliensis |
|---|---|---|---|---|---|
| Inoculum Level | 6.00 | 6.00 | 6.00 | 5.00 | 5.00 |
| Day 2 | <1.00 | <1.00 | <1.00 | <1.00 | 3.00 |
| Day 7 | <1.00 | <1.00 | <1.00 | <1.00 | <1.00 |
| Day 14 | <1.00 | <1.00 | <1.00 | <1.00 | <1.00 |
| Day 21 | <1.00 | <1.00 | <1.00 | <1.00 | <1.00 |
| Day 28 | <1.00 | <1.00 | <1.00 | <1.00 | <1.00 |

TABLE 9C

MCT data for Example 11.
$Log_{10}$ CFU/g

|  | Staphylococcus aureus | Escherichia coli | Pseudomonas aeruginosa | Candida albicans | Aspergillus brasiliensis |
|---|---|---|---|---|---|
| Inoculum Level | 6.00 | 6.00 | 6.00 | 5.00 | 5.00 |
| Day 2 | <1.00 | <1.00 | 1.00 | 2.50 | 3.00 |
| Day 7 | <1.00 | <1.00 | <1.00 | <1.00 | 2.18 |
| Day 14 | <1.00 | <1.00 | <1.00 | <1.00 | <1.00 |
| Day 21 | <1.00 | <1.00 | <1.00 | <1.00 | <1.00 |
| Day 28 | <1.00 | <1.00 | <1.00 | <1.00 | <1.00 |

Examples 12 and 13—Preservation of Natural Lotion Formulations with MBCs

The natural lotion formulations shown in Table 10 for Examples 12 and 13 containing the MBCs of Examples 8 and 9, respectively, and Comparative Example 10 containing no MBC, were prepared according to the procedure described above (see Example 6). The MBCs were added to the formulations at 45-50° C. with adequate mixing as the emulsion was cooling.

TABLE 10

Natural lotion formulations of Examples 12-13 and Comparative Example 10.

| Ingredient (INCI) | Trade Name (Supplier) | Comp Ex 10 | Ex 12 | Ex 13 |
|---|---|---|---|---|
| Oil Phase | | | | |
| Triheptanoin | SustOleo MCT (INOLEX) | 5.00 | 5.00 | 5.00 |
| Glyceryl Stearate SE | SustOleo GMS-SE (INOLEX) | 4.00 | 4.00 | 4.00 |
| Heptyl Undecylenate | LexFeel Natural (INOLEX) | 5.00 | 5.00 | 5.00 |
| Hydrogenated Rapeseed Oil | SustOleo TSB (INOLEX) | 3.00 | 3.00 | 3.00 |
| Water Phase | | | | |
| Water | Purified Water | Q.S. to 100 wt % | Q.S. to 100 wt % | Q.S. to 100 wt % |
| Glycerin | Glycerin, USP | 3.00 | 3.00 | 3.00 |
| Xanthan Gum | Keltrol CG-T (CP Kelco) | 0.30 | 0.30 | 0.30 |
| Glyceryl Heptanoate (and) Captylhydroxamic Acid (and) Glycerin | MBC Example 9 | — | 1.00 | — |
| Glyceryl Heptanoate (and) Captylhydroxamic Acid (and) Propanediol | MBC Example 10 | — | — | 1.00 |
| pH Adjuster | | | | |
| Citric Acid | Citric acid (Sigma-Aldrich), 20% aq. solution | Q.S. to pH 6.3-6.7 | Q.S. to pH 6.3-6.7 | Q.S. to pH 6.3-6.7 |

A microbiological challenge test complying with the USP and PCPC compendial test methodologies was performed to determine the preservative efficacy of the formulations in Table 10. The results are shown in Tables 11A-C. Comparative Example 10 prepared without a MBC composition fails to demonstrate adequate preservative efficacy against bacteria and yeast and failed to meet the USP 51 and PCPC acceptance criteria, whereas the Examples 12-13 prepared with MBC compositions achieve broad spectrum preservative efficacy against bacteria, yeast, and mold and meet the compendial acceptance criteria.

TABLE 11A

MCT data for Comparative Example 10.
$\text{Log}_{10}$ CFU/g

| | Staphylococcus aureus | Escherichia coli | Pseudomonas aeruginosa | Candida albicans | Aspergillus brasiliensis |
|---|---|---|---|---|---|
| Inoculum Level | 5.88 | 5.94 | 5.94 | 5.77 | 5.70 |
| Day 2 | 5.00 | 5.00 | 5.00 | 5.00 | 3.56 |
| Day 7 | 3.87 | 5.00 | 5.00 | 5.00 | 2.26 |
| Day 14 | 3.85 | 5.00 | 5.00 | 5.00 | 2.26 |
| Day 21 | 3.82 | 5.00 | 5.00 | 5.00 | 2.00 |
| Day 28 | 3.78 | 5.00 | 5.00 | 5.00 | 1.78 |

TABLE 11B

BMCT data for Example 12.
$\text{Log}_{10}$ CFU/g

| | Staphylococcus aureus | Escherichia coli | Pseudomonas aeruginosa | Candida albicans | Aspergillus brasiliensis |
|---|---|---|---|---|---|
| Inoculum Level | 5.88 | 5.94 | 5.94 | 5.77 | 5.70 |
| Day 2 | <1.00 | <1.00 | <1.00 | <1.00 | 3.43 |
| Day 7 | <1.00 | <1.00 | <1.00 | <1.00 | <1.00 |

TABLE 11B-continued

BMCT data for Example 12.
$\text{Log}_{10}$ CFU/g

| | Staphylococcus aureus | Escherichia coli | Pseudomonas aeruginosa | Candida albicans | Aspergillus brasiliensis |
|---|---|---|---|---|---|
| Day 14 | <1.00 | <1.00 | <1.00 | <1.00 | <1.00 |
| Day 21 | <1.00 | <1.00 | <1.00 | <1.00 | <1.00 |
| Day 28 | <1.00 | <1.00 | <1.00 | <1.00 | <1.00 |

TABLE 11C

CMCT data for Example 13.
$\text{Log}_{10}$ CFU/g

| | Staphylococcus aureus | Escherichia coli | Pseudomonas aeruginosa | Candida albicans | Aspergillus brasiliensis |
|---|---|---|---|---|---|
| Inoculum Level | 5.88 | 5.94 | 5.94 | 5.77 | 5.70 |
| Day 2 | 3.61 | <1.00 | 2.30 | 3.00 | 3.20 |
| Day 7 | <1.00 | <1.00 | <1.00 | <1.00 | 3.20 |
| Day 14 | <1.00 | <1.00 | <1.00 | <1.00 | 1.84 |
| Day 21 | <1.00 | <1.00 | <1.00 | <1.00 | <1.00 |
| Day 28 | <1.00 | <1.00 | <1.00 | <1.00 | <1.00 |

Examples 14 and 15—Preservation of Natural Shampoo with MBCs

The natural shampoo formulations shown in Table 12 for Examples 14 and 15 containing the MBCs of Examples 8 and 9, respectively, and Comparative Example 11 containing no MBC, were prepared according to the following procedure: To an appropriately sized beaker equipped with overhead mechanical stirrer were charged water (90% of total batch amount), lauryl glucoside, sodium cocoyl glutamate, cocamidopropyl betaine, and the MBC as indicated in Table 12. The batch was mixed at low to medium speed until the contents were uniform, and then the pH was adjusted to 5.1±0.1 using citric acid (10% aqueous solution) and the remaining water added in q.s. to 100 wt %.

TABLE 12

Natural shampoo formulations of Examples 14-15 and Comparative Example 11.

| | | Formula Wt % (as supplied) | | |
|---|---|---|---|---|
| Ingredient—INCI Name | Trade Name (Supplier) | Comp Ex 11 | Ex 14 | Ex 15 |
| Water | Purified Water, USP | Q.S. to 100 wt % | Q.S. to 100 wt % | Q.S. to 100 wt % |
| Lamyl Glucoside | Plantaren 1200N UP (BASF) | 14.00 | 14.00 | 14.00 |
| Sodium Cocoyl Glutamate | Hostapon CGN (Clariant) | 5.00 | 5.00 | 5.00 |
| Cocoamidopropyl Betaine | Lexaine C (INOLEX) | 7.00 | 7.00 | 7.00 |
| Glyceryl Heptanoate (and) Capylhydroxamic Acid (and) Glycerin | MBC Example 9 | — | 1.00 | — |
| Glyceryl Heptanoate (and) Capylhydroxamic Acid (and) Propanediol | MBC Example 10 | — | — | 1.50 |
| pH adjuster | | | | |
| Citric Acid | Citric acid (Sigma-Aldrich), 10% aq. solution | Q.S. to pH 5.0-5.2 | Q.S. to pH 5.0-5.2 | Q.S. to pH 5.0-5.2 |

A microbiological challenge test complying with the USP and PCPC compendial test methodologies was performed to determine the preservative efficacy of the formulations in Table 12. The results are shown in Tables 13A-C. Comparative Example 11 prepared without a MBC composition fails to demonstrate adequate preservative efficacy against bacteria and yeast and failed to meet the USP 51 and PCPC acceptance criteria, whereas the Examples 14-15 prepared with MBC compositions achieve broad spectrum preservative efficacy against bacteria, yeast, and mold and meet the compendial acceptance criteria.

TABLE 13A

MCT data for Comparative Example 11.
$\text{Log}_{10}$ CFU/g

| | Staphylococcus aureus | Escherichia coli | Pseudomonas aeruginosa | Candida albicans | Aspergillus brasiliensis |
|---|---|---|---|---|---|
| Inoculum Level | 6.00 | 6.00 | 6.00 | 5.00 | 5.00 |
| Day 2 | <1.00 | 5.00 | 5.00 | 3.50 | 3.08 |
| Day 7 | <1.00 | 5.00 | 2.48 | 2.60 | 3.00 |
| Day 14 | <1.00 | 3.99 | <1.00 | 2.11 | 3.00 |
| Day 21 | <1.00 | 2.60 | <1.00 | 2.11 | 2.97 |
| Day 28 | <1.00 | 1.90 | <1.00 | 2.08 | 2.95 |

TABLE 13B

MCT data for Example 14.
$\text{Log}_{10}$ CFU/g

| | Staphylococcus aureus | Escherichia coli | Pseudomonas aeruginosa | Candida albicans | Aspergillus brasiliensis |
|---|---|---|---|---|---|
| Inoculum Level | 5.88 | 5.94 | 5.94 | 5.77 | 5.70 |
| Day 2 | <1.00 | <1.00 | <1.00 | 2.60 | 3.37 |
| Day 7 | <1.00 | <1.00 | <1.00 | 1.30 | 2.46 |
| Day 14 | <1.00 | <1.00 | <1.00 | <1.00 | 1.31 |
| Day 21 | <1.00 | <1.00 | <1.00 | <1.00 | <1.00 |
| Day 28 | <1.00 | <1.00 | <1.00 | <1.00 | <1.00 |

TABLE 13C

MCT data for Example 15.
$\text{Log}_{10}$ CFU/g

| | Staphylococcus aureus | Escherichia coli | Pseudomonas aeruginosa | Candida albicans | Aspergillus brasiliensis |
|---|---|---|---|---|---|
| Inoculum Level | 6.00 | 6.00 | 6.00 | 5.00 | 5.00 |
| Day 2 | <1.00 | 2.40 | 2.32 | 3.08 | 3.26 |
| Day 7 | <1.00 | <1.00 | <1.00 | 1.70 | 3.20 |
| Day 14 | <1.00 | <1.00 | <1.00 | <1.00 | 2.70 |
| Day 21 | <1.00 | <1.00 | <1.00 | <1.00 | 1.90 |
| Day 28 | <1.00 | <1.00 | <1.00 | <1.00 | 1.30 |

Examples 16 and 17—Preservation of a Sunscreen Formulation with MBCs

The sunscreen formulations shown in Table 14 for Examples 16 and 17 containing the MBCs of Examples 8 and 9, respectively, and Comparative Example 11 containing no MBC, were prepared according to the following procedure: To an appropriately sized beaker equipped with an overhead mechanical stirrer and hotplate were added water, the glycerin-xanthan gum pre-mix, butylene glycol, tetrasodium EDTA, and MBC as indicated in Table 14. This water phase was heated to 80° C. and mixed until uniform. The oil phase ingredients were combined in a separate beaker, heated to 80° C., and mixed until uniform. When both phases were at 80° C. and uniform, the oil phase was added to the water phase while mixing at medium to high speed to form an emulsion. The emulsion was homogenized at 3500 rpm for three minutes. The batch was allowed to cool to 45° C. while mixing, and during the cool down period Simulgel NS and silica were added to the formulation and mixed until uniform. Upon cooling to ambient temperature (23° C.±2° C.), citric acid (10% aqueous solution) and sodium hydroxide (10% aqueous solution) were used to adjust the batch pH to 6.5±0.2. The batch was mixed until uniform and then discharged to an appropriate container for storage.

TABLE 14

Sunscreen formulations of Examples 16-17 and Comparative Example 12.

| Ingredient Name | | Formula Wt % (as supplied) | | |
|---|---|---|---|---|
| INCI/USAN | Trade Name (Supplier) | Comp Ex 12 | Ex 16 | Ex 17 |
| Oil Phase | | | | |
| Glyceryl Stearate (and) PEG-100 Stearate | Lexemul 561 (INOLEX) | 2.50 | 2.50 | 2.50 |
| Octomylene | Octomylene, USP | 8.00 | 8.00 | 8.00 |
| Octisalate | PARSOL EHS (DSM) | 5.00 | 5.00 | 5.00 |
| Avobenzone | PARSOL 1789 (DSM) | 3.00 | 3.00 | 3.00 |
| Homosalate | PARSOL HMS (DSM) | 13.00 | 13.00 | 13.00 |
| Trimethylpentanediol/Adipic Acid/Glycerin Crosspolymer | WetFilm (INOLEX) | 3.00 | 3.00 | 3.00 |
| Neopentyl Glycol Diheptanoate | LexFeel 7 (INOLEX) | 2.50 | 2.50 | 2.50 |
| Water Phase | | | | |
| Water | Purified Water | Q.S. to 100 wt % | Q.S. to 100 wt % | Q.S. to 100 wt % |
| Glycerin | Glycerin, USP | 1.50 | 1.50 | 1.50 |
| Xanthan Gum | Keltrol CG-T (CP Kelco) | 0.40 | 0.40 | 0.40 |
| Butylene Glycol | Butylene Glycol (Univar) | 1.00 | 1.00 | 1.00 |
| Tetrasodium EDTA | Tetrasodium EDTA (MakingCosmetics) | 0.10 | 0.10 | 0.10 |
| Glyceryl Heptanoate (and) Capiylhydroxamic Acid (and) Glycerin | MBC Example 9 | — | 1.00 | — |
| Glyceryl Heptanoate (and) Capiylhydroxamic Acid (and) Propanediol | MBC Example 10 | — | — | 1.00 |
| pH Adjuster | | | | |
| Citric Acid | Citric acid (Sigma-Aldrich), 10% aq. solution | Q.S. to pH 6.3-6.7 | Q.S. to pH 6.3-6.7 | Q.S. to pH 6.3-6.7 |
| Sodium Hydroxide | Sodium Hydroxide (Sigma-Aldrich), 10% aq. solution | Q.S. to pH 6.3-6.7 | Q.S. to pH 6.3-6.7 | Q.S. to pH 6.3-6.7 |

A microbiological challenge test complying with the USP and PCPC compendial test methodologies was performed to determine the preservative efficacy of the formulations in Table 14. The results are shown in Tables 15A-C. Comparative Example 12 prepared without a MBC composition fails to demonstrate adequate preservative efficacy against bacteria and yeast and failed to meet the USP 51 and PCPC acceptance criteria, whereas the Examples 14-15 prepared with MBC compositions achieve broad spectrum preservative efficacy against bacteria, yeast, and mold and meet the compendial acceptance criteria.

TABLE 15A

MCT data for Comparative Example 12.
$Log_{10}$ CFU/g

| | Staphylococcus aureus | Escherichia coli | Pseudomonas aeruginosa | Candida albicans | Aspergillus brasiliensis |
|---|---|---|---|---|---|
| Inoculum Level | 6.00 | 6.00 | 6.00 | 5.00 | 5.00 |
| Day 2 | 5.00 | 5.00 | 5.00 | 3.38 | 3.38 |
| Day 7 | 5.00 | 5.00 | 5.00 | 2.60 | 3.38 |
| Day 14 | 5.00 | 5.00 | 5.00 | 2.15 | 3.38 |
| Day 21 | 3.26 | 4.00 | 5.00 | 1.00 | 3.34 |
| Day 28 | 1.00 | 3.11 | 5.00 | <1.00 | 3.32 |

TABLE 15B

MCT data for Example 16.
$Log_{10}$ CFU/g

| | Staphylococcus aureus | Escherichia coli | Pseudomonas aeruginosa | Candida albicans | Aspergillus brasiliensis |
|---|---|---|---|---|---|
| Inoculum Level | 5.88 | 5.94 | 5.94 | 5.77 | 5.70 |
| Day 2 | 3.11 | <1.00 | <1.00 | <1.00 | 3.49 |
| Day 7 | 2.17 | <1.00 | <1.00 | <1.00 | 2.15 |
| Day 14 | <1.00 | <1.00 | <1.00 | <1.00 | 2.32 |
| Day 21 | <1.00 | <1.00 | <1.00 | <1.00 | <1.00 |
| Day 28 | <1.00 | <1.00 | <1.00 | <1.00 | <1.00 |

TABLE 15C

CMCT data for Example 17.
$Log_{10}$ CFU/g

| | Staphylococcus aureus | Escherichia coli | Pseudomonas aeruginosa | Candida albicans | Aspergillus brasiliensis |
|---|---|---|---|---|---|
| Inoculum Level | 6.00 | 6.00 | 6.00 | 5.00 | 5.00 |
| Day 2 | 3.90 | <1.00 | <1.00 | 3.18 | 3.30 |
| Day 7 | 3.00 | <1.00 | <1.00 | <1.00 | 2.08 |
| Day 14 | 2.00 | <1.00 | <1.00 | <1.00 | <1.00 |
| Day 21 | <1.00 | <1.00 | <1.00 | <1.00 | <1.00 |
| Day 28 | <1.00 | <1.00 | <1.00 | <1.00 | <1.00 |

What is claimed is:

1. A biobased monoglyceryl monoester preservation composition comprising:

a mixture including one or more compounds of Formula (I):

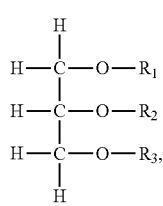

wherein $R_1$, $R_2$, and $R_3$ are independently —H or —C(O)—$C_6$ alkyl;

wherein the composition comprises greater than about 65 wt % and less than about 75 wt % glyceryl monoheptanoate;

wherein the composition comprises glyceryl diheptanoate, glyceryl triheptanoate, or a combination thereof in a concentration of about 2 wt % to about 35 wt %;

wherein the composition comprises less than about 30 wt % glycerol;

wherein at least 98% of the —C(O)—$C_6$ alkyl groups present in the composition are n-heptanoyl; and wherein the carbon present in the one or more compounds of Formula (I) is biobased.

2. The composition of claim 1, wherein the glyceryl diheptanoate, glyceryl triheptanoate, or a combination thereof is in a concentration of about 2 wt % to about 30 wt %.

3. The composition of claim 1, wherein the composition comprises less than about 20 wt % glycerol.

4. The composition of claim 1, wherein the composition has an average glyceryl degree of esterification of about 1.0 to about 1.4.

5. The composition of claim 1, wherein at least 99% of the —C(O)—$C_6$ alkyl groups present in the composition are n-heptanoyl.

6. The composition of claim 1, wherein the composition has an $ET_{50}$ value of >24 hr when tested as a 1% solution in water according to the EpiDerm Skin Irritation Test (OECD 439).

7. The composition of claim 1, wherein the composition has an MTT cell viability value of >50% at approximately 24 hours, when tested as a 1% solution in water according to the EpiDerm Skin Irritation Test (OECD 439).

8. The composition of claim 1, further comprising a booster selected from the group consisting of: one or more polyols, one or more glyceryl ethers, one or more chelating agents, and combinations thereof.

9. The composition of claim 8, wherein the composition comprises one or more polyols selected from the group consisting of: glycerin, propanediol, 1,2 propanediol, 1,2 butanediol, 1,3-butanediol, 1,4-butanediol, 2,3-butanediol, 1,2-hexanediol, 1,2-heptanediol, 2,3 octanediol, caprylyl glycol, decylene glycol, sorbitol, sorbitan, and combinations thereof.

10. The composition of claim 8, wherein the composition comprises one or more glyceryl ethers selected from the group consisting of: hexylglycerin, cyclohexylglycerin, heptylglycerin, caprylyl glyceryl ether, methylheptylglycerin, ethylhexylglycerin, and combinations thereof.

11. The composition of claim 8, wherein the composition comprises one or more chelating agents selected from the group consisting of: heptanohydroxamic acid and salts thereof, caprylohydroxamic acid (caprylhydroxamic acid) and salts thereof, pelargohydroxamic acid and salts thereof, citric acid and salts thereof, caprohydroxamic acid and salts thereof, tetrasodium glutamate diacetate, phytic acid and salts thereof, gluconic acid and salts thereof, galacturonic acid and salts thereof, galactaric acid and salts thereof, and combinations thereof.

12. A formulation for a personal care, home and institutional care, pharmaceutical, veterinary care, oral care, textile care, metalworking, or food processing product comprising the biobased monoglyceryl monoester preservation composition of claim 1, wherein the composition is present in the formulation in a range from about 0.05 wt % to about 10 wt %.

13. The formulation of claim 12, wherein the formulation is preserved against microbial contamination for a period of at least 12 months.

14. The formulation of claim 12, wherein the formulation has equal or superior preservation against microbial contamination compared to a reference formulation containing a $C_8$ to $C_{14}$ MGME composition in the same concentration by weight as the composition of claim 1 is present in the formulation.

15. The formulation of claim 12, wherein the formulation has a turbidity value less than about 100 NTU.

16. The formulation of claim 12, further comprising at least one ingredient selected from the group consisting of: water, surfactants, including anionic, cationic, nonionic and zwitterionic surfactants, emulsifiers, emollients, humectants, conditioning agents for hair, skin or nails, chelating agents, active agents, bleaching or whitening agents, additional pH adjusting agents, fragrances, colorants, exfoliating agents, antioxidants, botanical ingredients, plant extracts, mica, smectite, thickeners, rheology modifiers, cannabinoids, oils, dyes, waxes, amino acids, nucleic acids, vitamins, hydrolyzed proteins and derivatives thereof, glycerin and derivates thereof, enzymes, anti-inflammatory and other medicaments, microbiocides, antifungals, antiseptics, antioxidants, UV absorbers, dyes and pigments, preservatives, sunscreen active agents, antiperspirant active agents, oxidizers, pH balancing agents, moisturizers, peptides and derivatives thereof, anti-aging actives, hair growth promoters, anti-cellulite actives, and combinations thereof.

17. A method of preserving a formulation against microbial contamination comprising adding a sufficient amount of the biobased monoglyceryl monoester preservation composition of claim 1 to the formulation.

18. A microbiostatic concentrate comprising:
the biobased monoglyceryl monoester preservation composition of claim 1,
caprylhydroxamic acid; and
at least one of glycerin and a $C_3$-$C_4$ diol.

19. The microbiostatic concentrate of claim 18, wherein the concentrate comprises:
the biobased monoglyceryl monoester preservation composition of claim 1 in an amount from about 30 wt % to about 85 wt %, and
glycerin, $C_3$-$C_4$ diol, or a combination thereof in an amount from about 1 wt % to about 70 wt %.

20. The microbiostatic concentrate of claim 18, further comprising one or more chelating agents selected from the group consisting of: heptanohydroxamic acid and salts thereof, caprylohydroxamic acid (caprylhydroxamic acid) and salts thereof, pelargohydroxamic acid and salts thereof, citric acid and salts thereof, caprohydroxamic acid and salts thereof, tetrasodium glutamate diacetate, phytic acid and salts thereof, gluconic acid and salts thereof, galacturonic acid and salts thereof, galactaric acid and salts thereof, and combinations thereof.

21. The composition of claim 1, wherein the composition comprises less than about 10 wt % glycerol.

22. The composition of claim 1, wherein the composition comprises less than about 2 wt % glycerol.

23. The composition of claim 11, wherein the composition comprises caprylohydroxamic acid (caprylhydroxamic acid) and salts thereof.

24. The composition of claim 1, further comprising one or more hydroxamic acids selected from the group consisting of: heptanohydroxamic acid and salts thereof, caprylohydroxamic acid (caprylhydroxamic acid) and salts thereof, pelargohydroxamic acid and salts thereof, and caprohydroxamic acid and salts thereof.

* * * * *